US012626006B1

(12) United States Patent   (10) Patent No.: US 12,626,006 B1
Ahlquist et al.   (45) Date of Patent: May 12, 2026

(54) DYNAMIC PRIVACY PRESERVING DATA LINKAGE IN DISTRIBUTED COMPUTING SYSTEMS

(71) Applicant: Amazon Technologies, Inc., Seattle, WA (US)

(72) Inventors: Kevan Ahlquist, Minneapolis, MN (US); Andrew Tyler Compton, Richfield, MN (US); Michael Curtis Lindahl, Chanhassen, MN (US); Sandeep Kumar Proddaturi, Inver Grove Heights, MN (US); Manish Jyoti, Edmonds, WA (US); Srinivas R. Mudireddy, Duluth, GA (US); Sergey Slovetskiy, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 196 days.

(21) Appl. No.: 18/212,022

(22) Filed: Jun. 20, 2023

(51) Int. Cl.
G06F 21/62 (2013.01)

(52) U.S. Cl.
CPC ................................ G06F 21/6245 (2013.01)

(58) Field of Classification Search
CPC ...... G06F 21/60; G06F 21/62; G06F 21/6218; G06F 21/6245
See application file for complete search history.

(56) References Cited

U.S. PATENT DOCUMENTS

| | | | |
|---|---|---|---|
| 10,404,757 B1* | 9/2019 | Horton | H04L 67/02 |
| 2016/0210470 A1* | 7/2016 | Rozenberg | G06F 21/6227 |
| 2018/0150647 A1* | 5/2018 | Naqvi | H04L 9/321 |
| 2018/0248940 A1* | 8/2018 | Cahana | H04L 43/0805 |
| 2019/0180272 A1* | 6/2019 | Douglas | H04L 67/1097 |
| 2020/0117824 A1* | 4/2020 | Upadhyay | G06F 16/258 |
| 2023/0015819 A1* | 1/2023 | Nickels | H04L 63/0435 |

* cited by examiner

*Primary Examiner* — D'Arcy Winston Straub
(74) *Attorney, Agent, or Firm* — K&L Gates LLP

(57) ABSTRACT

Devices and techniques are generally described for dynamic privacy preserving data linkages. In some examples, a first data structure may store non-personal data and a second data structure may store personally identifiable information (PII). The second data structure may store first identifier data identifying first PII. A first computing service may generate first transient identifier data associated with a first time-to-live (TTL) value. The first computing service may store the first transient identifier data and the first TTL value in a third data structure in association with the first identifier data. The first computing service may send the first transient identifier data to a first computer processing system. In some examples, the first computer processing system may not be privileged to directly access the second data structure.

20 Claims, 23 Drawing Sheets

Non-Personal Data:

- non-Personal Microdata,
- Transactional Nanodata

| Non-Personal Data | | |
|---|---|---|
| Action | TimeDate | Transaction ID |
| Move | 15:00 05/04/22 | $Tr_1$ |
| Load | 02:30 06/11/22 | $Tr_2$ |
| Save | 11:05 07/01/22 | $Tr_3$ |

Personal Data:

- Personally Identifying Information
- Data generated by Data Subject (Person)

| Person Data | | |
|---|---|---|
| Person ID | First Name | Family Name |
| $P_1$ | John | Smith |
| $P_2$ | Jane | Doe |
| $P_3$ | Jake | Weary |

FIG. 1

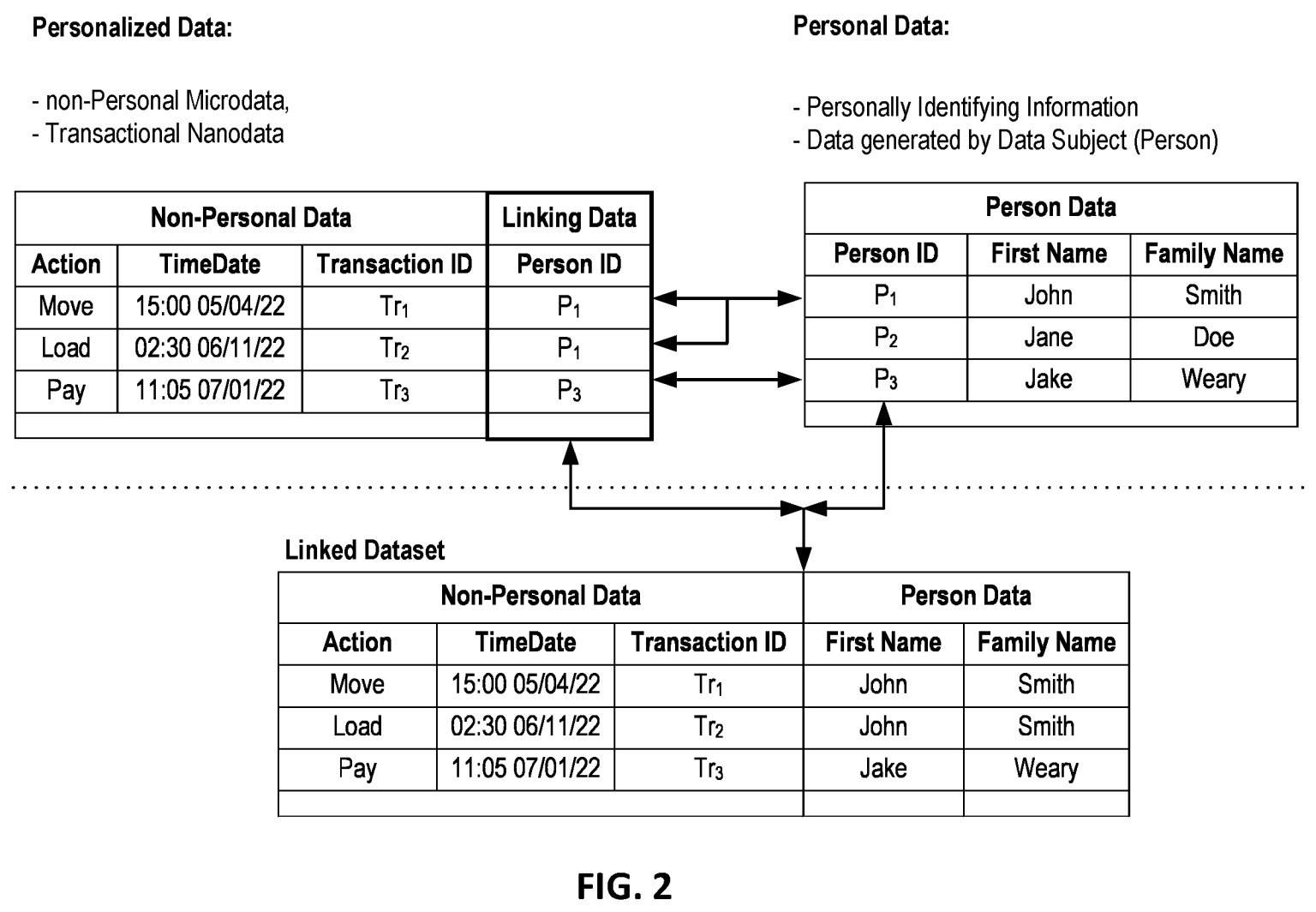

Personal Data:

- Personally Identifying Information
- Data generated by Data Subject (Person)

Personalized Data:

- non-Personal Microdata,
- Transactional Nanodata

Person Data

| Person ID | First Name | Family Name |
|-----------|-----------|-------------|
| $P_1$ | John | Smith |
| $P_2$ | Jane | Doe |
| $P_3$ | Jake | Weary |

Non-Personal Data

| Action | TimeDate | Transaction ID |
|--------|----------|----------------|
| Move | 15:00 05/04/22 | $Tr_1$ |
| Load | 02:30 06/11/22 | $Tr_2$ |
| Pay | 11:05 07/01/22 | $Tr_3$ |

Linking Data

| Person ID |
|-----------|
| $P_1$ |
| $P_1$ |
| $P_3$ |

Linked Dataset

Non-Personal Data / Person Data

| Action | TimeDate | Transaction ID | First Name | Family Name |
|--------|----------|----------------|-----------|-------------|
| Move | 15:00 05/04/22 | $Tr_1$ | John | Smith |
| Load | 02:30 06/11/22 | $Tr_2$ | John | Smith |
| Pay | 11:05 07/01/22 | $Tr_3$ | Jake | Weary |

FIG. 2

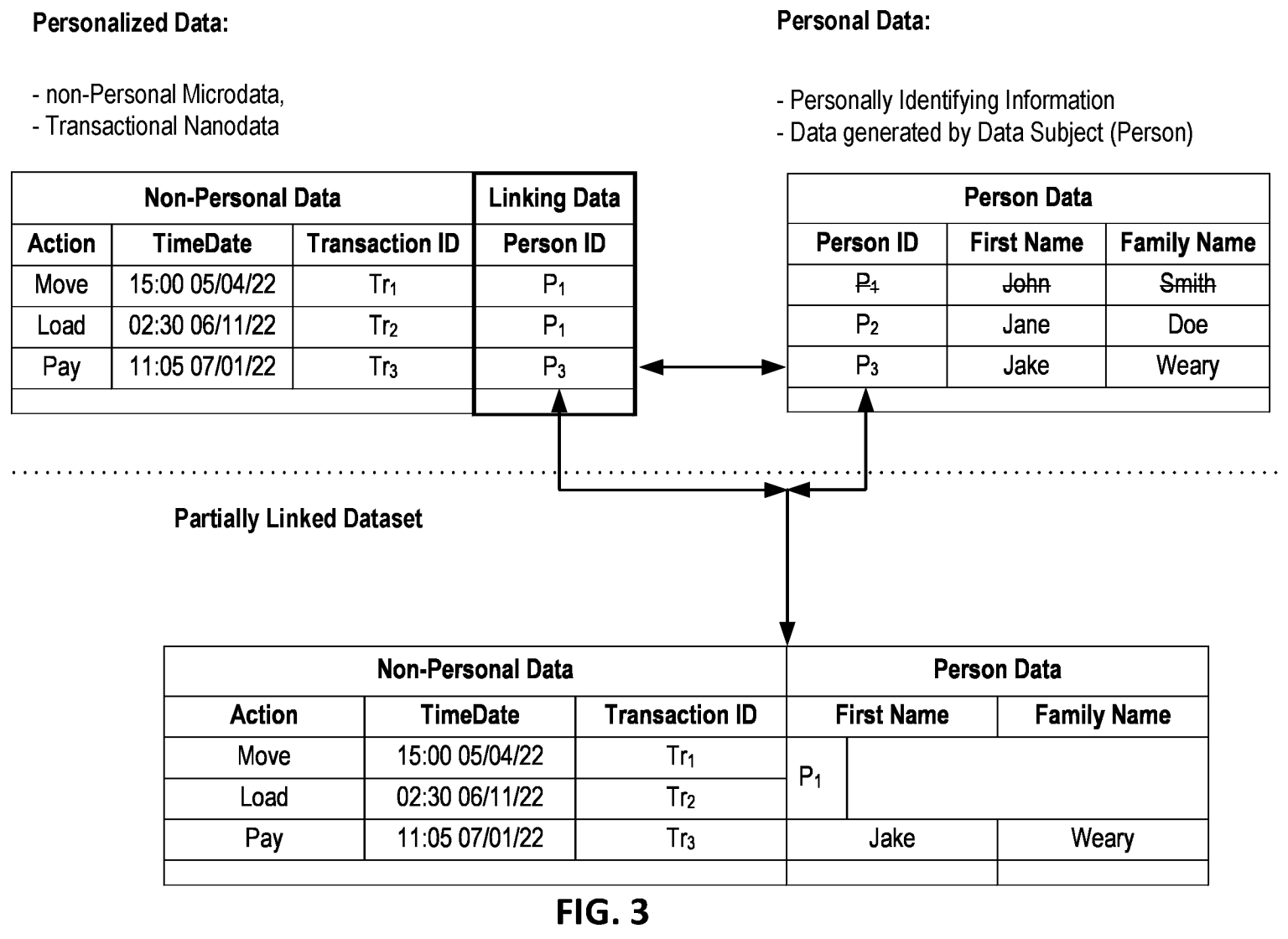

Personalized Data:

- non-Personal Microdata,
- Transactional Nanodata

Personal Data:

- Personally Identifying Information
- Data generated by Data Subject (Person)

Non-Personal Data

| Action | TimeDate | Transaction ID |
|--------|----------|----------------|
| Move | 15:00 05/04/22 | Tr₁ |
| Load | 02:30 06/11/22 | Tr₂ |
| Pay | 11:05 07/01/22 | Tr₃ |

Linking Data

| Person ID |
|-----------|
| P₁ |
| P₁ |
| P₃ |

Person Data

| Person ID | First Name | Family Name |
|-----------|------------|-------------|
| P₄ | ~~John~~ | ~~Smith~~ |
| P₂ | Jane | Doe |
| P₃ | Jake | Weary |

Partially Linked Dataset

Non-Personal Data

| Action | TimeDate | Transaction ID |
|--------|----------|----------------|
| Move | 15:00 05/04/22 | Tr₁ |
| Load | 02:30 06/11/22 | Tr₂ |
| Pay | 11:05 07/01/22 | Tr₃ |

Person Data

| Transaction ID | First Name | Family Name |
|----------------|------------|-------------|
| Tr₁ | P₁ | |
| Tr₂ | | |
| Tr₃ | Jake | Weary |

FIG. 3

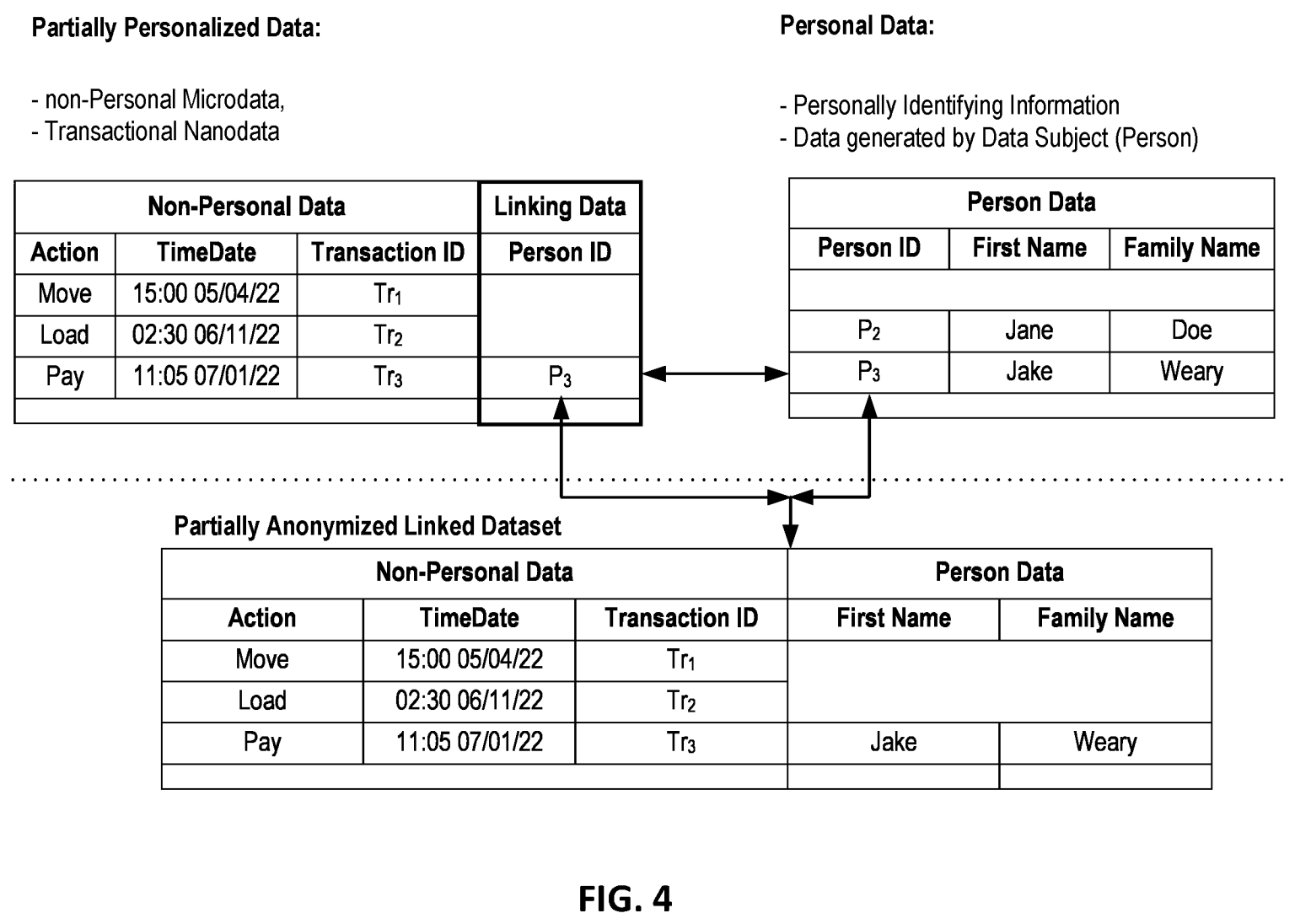

Personal Data:

- Personally Identifying Information
- Data generated by Data Subject (Person)

Person Data

| Person ID | First Name | Family Name |
|-----------|------------|-------------|
|           |            |             |
| $P_2$     | Jane       | Doe         |
| $P_3$     | Jake       | Weary       |

Partially Personalized Data:

- non-Personal Microdata,
- Transactional Nanodata

Non-Personal Data / Linking Data

| Action | TimeDate | Transaction ID | Person ID |
|--------|----------|----------------|-----------|
| Move | 15:00 05/04/22 | $Tr_1$ |  |
| Load | 02:30 06/11/22 | $Tr_2$ |  |
| Pay | 11:05 07/01/22 | $Tr_3$ | $P_3$ |

Partially Anonymized Linked Dataset

Person Data

| First Name | Family Name |
|------------|-------------|
|            |             |
| Jake       | Weary       |
|            |             |

Non-Personal Data

| Action | TimeDate | Transaction ID |
|--------|----------|----------------|
| Move | 15:00 05/04/22 | $Tr_1$ |
| Load | 02:30 06/11/22 | $Tr_2$ |
| Pay | 11:05 07/01/22 | $Tr_3$ |

FIG. 4

Personal Data Record Creation

Mapping of Non-Personal to Personal Data

Retrieval of Personal Data with Dynamic Retention

Retrieval of Personal Data with Purpose-Based (Usage-Based) Access Control

Non-Personal Data:

- non-Personal Microdata,
- Transactional Nanodata

Non-Personal Data

| Action | TimeDate | Transaction ID |
|--------|----------|----------------|
| Move | 15:00 05/04/22 | $Tr_1$ |
| Load | 02:30 06/11/22 | $Tr_2$ |
| Pay | 11:05 07/01/22 | $Tr_3$ |

Personal Data:

- Personally Identifying Information
- Data generated by Data Subject (Person)

Person Data

| Person ID | First Name | Family Name |
|-----------|------------|-------------|
| $P_1$ | John | Smith |
| $P_2$ | Jane | Doe |
| $P_3$ | Jake | Weary |

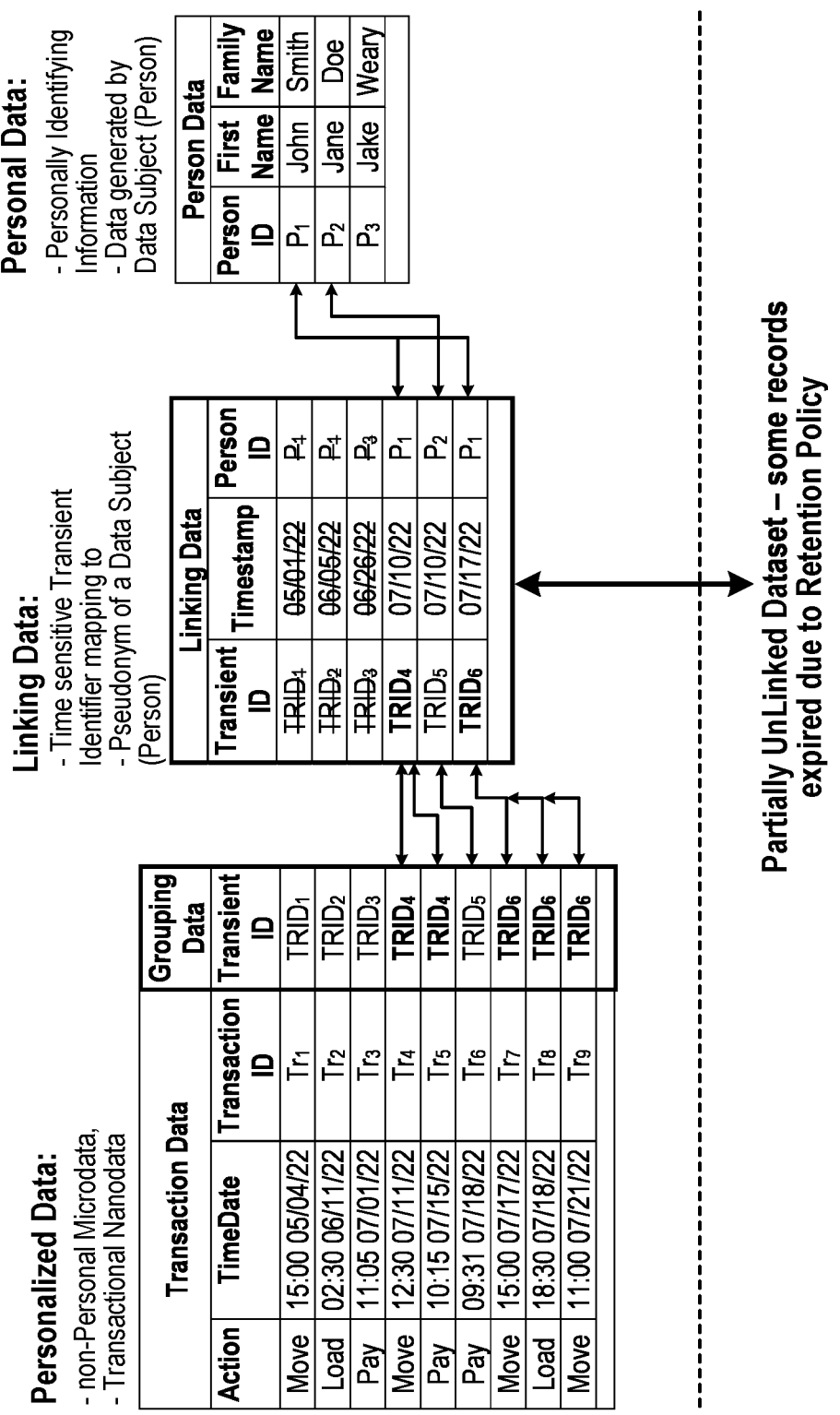

Personal Data:
- Personally Identifying Information
- Data generated by Data Subject (Person)

Person Data

| Person ID | First Name | Family Name |
|---|---|---|
| P₁ | John | Smith |
| P₂ | Jane | Doe |
| P₃ | Jake | Weary |

Linking Data:
- Time sensitive Transient Identifier mapping to
- Pseudonym of a Data Subject (Person)

Linking Data

| Transient ID | Timestamp | Person ID |
|---|---|---|
| TRID₄ | 05/04/22 | P₄ |
| TRID₂ | 06/05/22 | P₄ |
| TRID₃ | 06/26/22 | P₃ |
| TRID₄ | 07/10/22 | P₁ |
| TRID₅ | 07/10/22 | P₂ |
| TRID₆ | 07/17/22 | P₁ |

Personalized Data:
- non-Personal Microdata,
- Transactional Nanodata

Transaction Data

| Action | TimeDate | Transaction ID | Grouping Data Transient ID |
|---|---|---|---|
| Move | 15:00 05/04/22 | Tr₁ | TRID₁ |
| Load | 02:30 06/11/22 | Tr₂ | TRID₂ |
| Pay | 11:05 07/01/22 | Tr₃ | TRID₃ |
| Move | 12:30 07/11/22 | Tr₄ | TRID₄ |
| Pay | 10:15 07/15/22 | Tr₅ | TRID₄ |
| Pay | 09:31 07/18/22 | Tr₆ | TRID₅ |
| Move | 15:00 07/17/22 | Tr₇ | TRID₆ |
| Load | 18:30 07/18/22 | Tr₈ | TRID₆ |
| Move | 11:00 07/21/22 | Tr₉ | TRID₆ |

Partially UnLinked Dataset – some records expired due to Retention Policy

FIG. 13A

Linking Data

Partially UnLinked Dataset – some records
expired due to Retention Policy

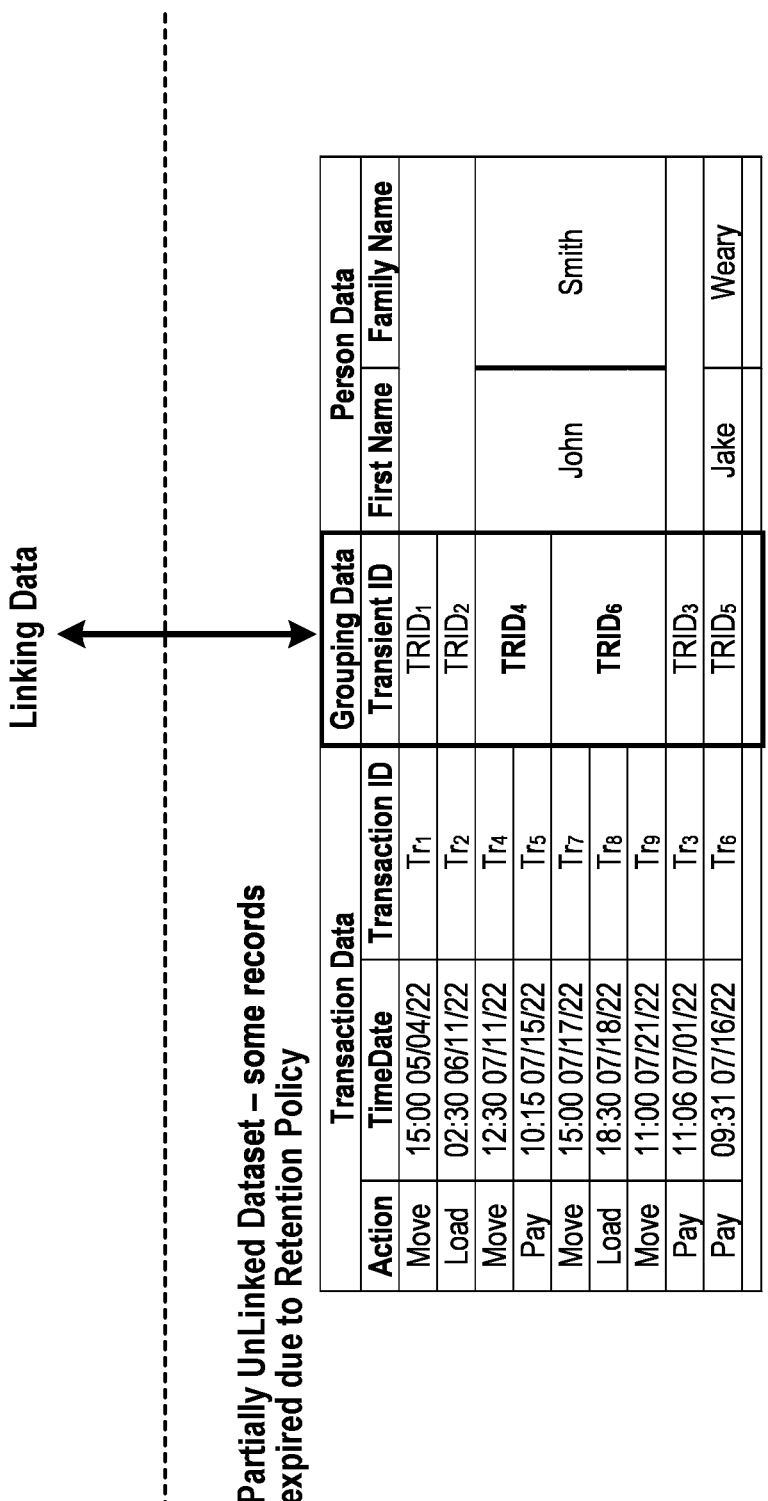

| Transaction Data | | | Grouping Data | Person Data | |
| --- | --- | --- | --- | --- | --- |
| Action | TimeDate | Transaction ID | Transient ID | First Name | Family Name |
| Move | 15:00 05/04/22 | $Tr_1$ | $TRID_1$ | | |
| Load | 02:30 06/11/22 | $Tr_2$ | $TRID_2$ | | |
| Move | 12:30 07/11/22 | $Tr_4$ | $TRID_4$ | John | Smith |
| Pay | 10:15 07/15/22 | $Tr_5$ | | | |
| Move | 15:00 07/17/22 | $Tr_7$ | $TRID_6$ | | |
| Load | 18:30 07/18/22 | $Tr_8$ | | | |
| Move | 11:00 07/21/22 | $Tr_9$ | | | |
| Pay | 11:06 07/01/22 | $Tr_3$ | $TRID_3$ | Jake | Weary |
| Pay | 09:31 07/16/22 | $Tr_6$ | $TRID_5$ | | |

FIG. 13B

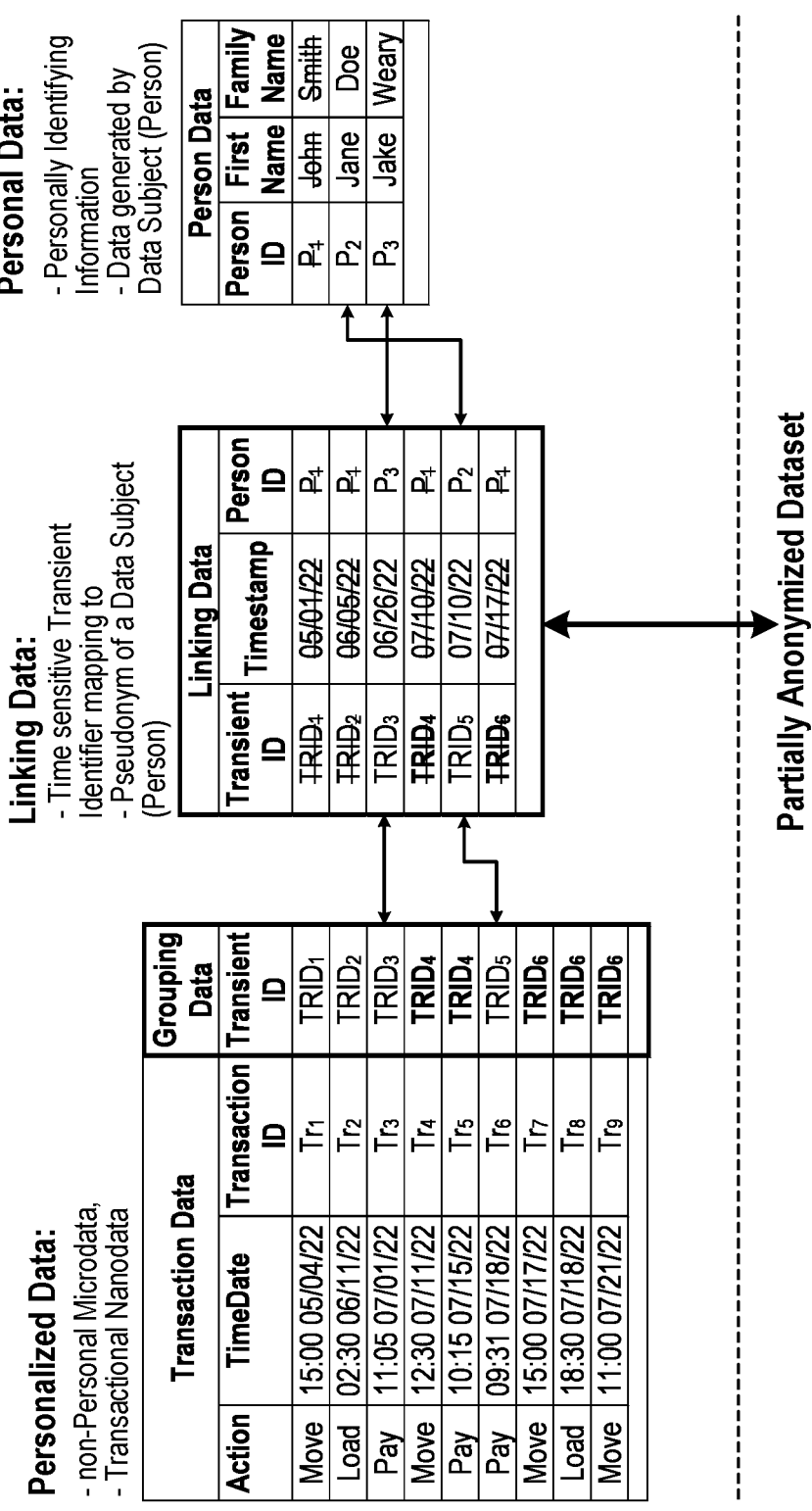

Personal Data:
- Personally Identifying Information
- Data generated by Data Subject (Person)

Person Data

| Person ID | First Name | Family Name |
|---|---|---|
| P₁ | ~~John~~ | ~~Smith~~ |
| P₂ | Jane | Doe |
| P₃ | Jake | Weary |

Linking Data:
- Time sensitive Transient Identifier mapping to
- Pseudonym of a Data Subject (Person)

Linking Data

| Transient ID | Timestamp | Person ID |
|---|---|---|
| ~~TRID₁~~ | ~~05/01/22~~ | P₁ |
| ~~TRID₂~~ | ~~06/05/22~~ | P₁ |
| TRID₃ | 06/26/22 | P₃ |
| TRID₄ | ~~07/10/22~~ | P₁ |
| TRID₅ | 07/10/22 | P₂ |
| ~~TRID₆~~ | ~~07/17/22~~ | P₁ |

Personalized Data:
- non-Personal Microdata,
- Transactional Nanodata

Transaction Data

| | | | Grouping Data |
|---|---|---|---|
| Action | TimeDate | Transaction ID | Transient ID |
| Move | 15:00 05/04/22 | Tr₁ | TRID₁ |
| Load | 02:30 06/11/22 | Tr₂ | TRID₂ |
| Pay | 11:05 07/01/22 | Tr₃ | TRID₃ |
| Move | 12:30 07/11/22 | Tr₄ | TRID₄ |
| Pay | 10:15 07/15/22 | Tr₅ | TRID₄ |
| Pay | 09:31 07/18/22 | Tr₆ | TRID₅ |
| Move | 15:00 07/17/22 | Tr₇ | TRID₆ |
| Load | 18:30 07/18/22 | Tr₈ | TRID₆ |
| Move | 11:00 07/21/22 | Tr₉ | TRID₆ |

Partially Anonymized Dataset

FIG. 14A

Linking Data

Partially Anonymized Dataset

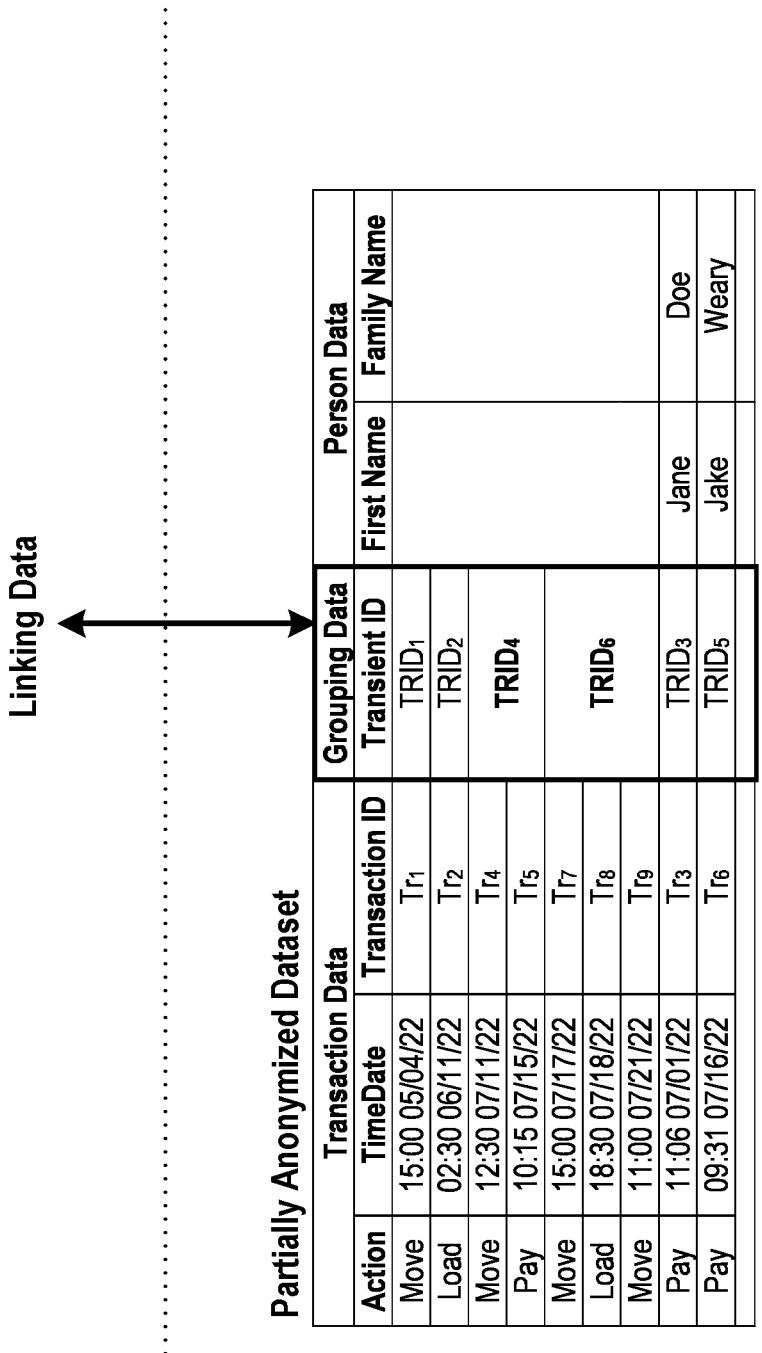

| Transaction Data | | | Grouping Data | Person Data | |
|---|---|---|---|---|---|
| Action | TimeDate | Transaction ID | Transient ID | First Name | Family Name |
| Move | 15:00 05/04/22 | Tr₁ | TRID₁ | | |
| Load | 02:30 06/11/22 | Tr₂ | TRID₂ | | |
| Move | 12:30 07/11/22 | Tr₄ | TRID₄ | | |
| Pay | 10:15 07/15/22 | Tr₅ | | | |
| Move | 15:00 07/17/22 | Tr₇ | | | |
| Load | 18:30 07/18/22 | Tr₈ | TRID₆ | | |
| Move | 11:00 07/21/22 | Tr₉ | | | |
| Pay | 11:06 07/01/22 | Tr₃ | TRID₃ | Jane | Doe |
| Pay | 09:31 07/16/22 | Tr₆ | TRID₅ | Jake | Weary |

Full Anonymization after User Personal Data Deletion Linking Data deleted together with the Personal Data for a deleted User (Data Subject). Transient Identifiers only group some of the Transactional Data and do not allow identification of a User. The Transactional Dataset can be linked ONLY to existing Users via Linking Data.

FIG. 14B

Personal Information Record Lifecycle subject to Purpose-based Usage, Retention, and Deletion Policy

DYNAMIC PRIVACY PRESERVING DATA LINKAGE IN DISTRIBUTED COMPUTING SYSTEMS

BACKGROUND

In order to comply with various government regulations and best practices, stewards of data are required to maintain strict control over the usage, distribution, handling, and retention of personal data related to individuals. In various examples, this includes instituting capabilities to retrieve and present all personal data on demand, delete all personal data on demand, and adhere to complicated time- and rules-based retention and deletion schedules for personal data.

BRIEF DESCRIPTION OF DRAWINGS

FIG. 1 is a diagram illustrating an example of unlinked non-personal data and personal data in two example data structures, in accordance with various aspects of the present disclosure.

FIG. 2 is a diagram illustrating data linking between personal and non-personal data through a linked dataset.

FIG. 3 is diagram illustrating an example of the de-linking of personal and non-personal data.

FIG. 4 is a diagram illustrating de-linking and anonymization of records of non-personal and personal data.

FIGS. 13A-13B depicts de-linking of non-personal data and personal data based on expiration of transient identifier data, in accordance with various aspects of the present disclosure.

FIGS. 14A-14B depicts full anonymization after user personal data deletion, in accordance with various aspects of the present disclosure.

DETAILED DESCRIPTION

Figure 5:
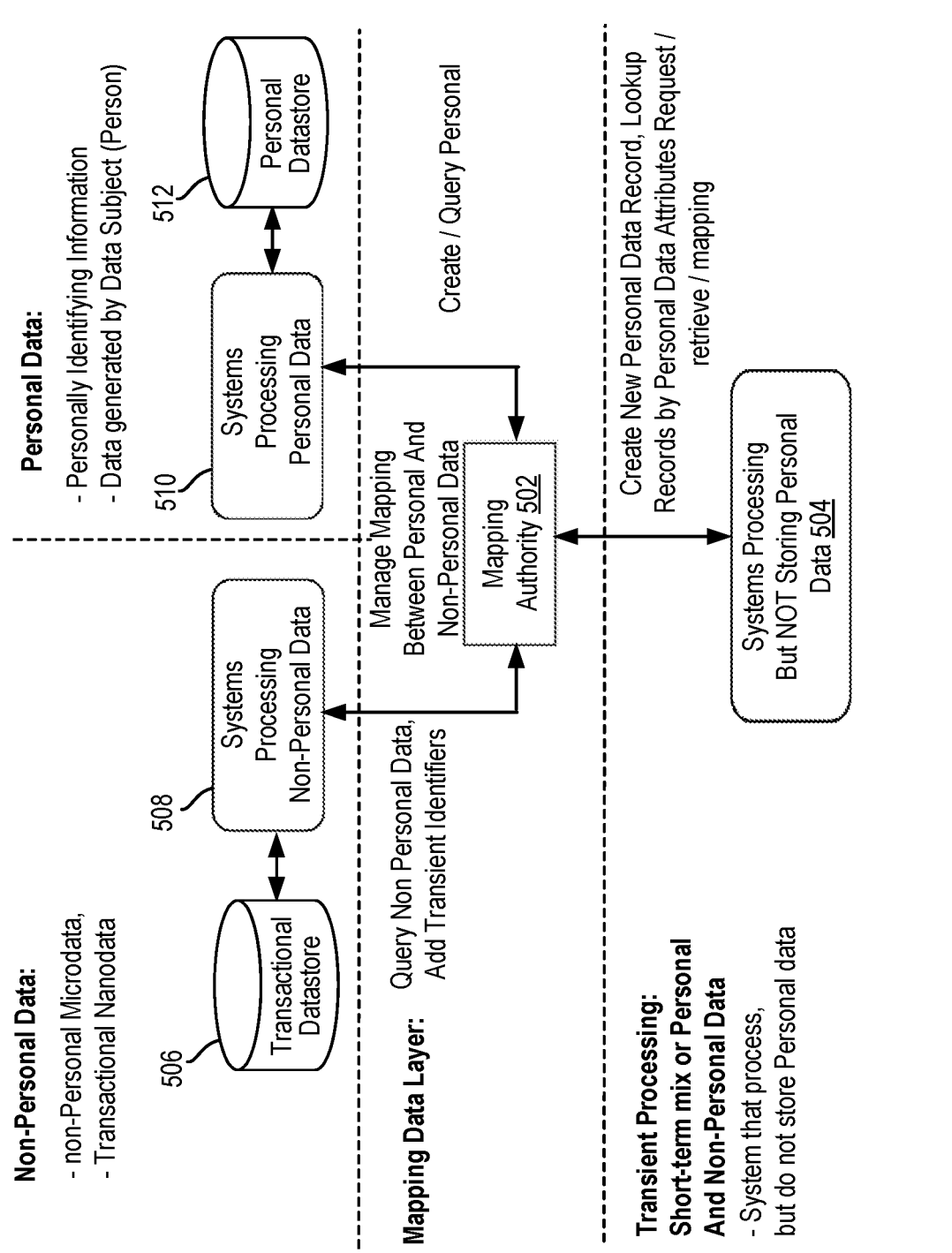
FIG. 5 is a block diagram illustrating an example system for dynamically generating privacy-preserving data linkages in distributed computing systems, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Storage and/or use of data related to a particular person or entity (e.g., personally identifiable information) may be required to comply with regulations, privacy policies, and/or legal requirements of the relevant jurisdictions. In many cases, users may be provided with the option of opting out of storage and/or usage of personal data and/or may select particular types of personal data that may be stored while preventing aggregation and storage of other types of personal data. Additionally, aggregation, storage, and/or use of personal data may be compliant with privacy controls, even if not legally subject to them. For example, storage and/or use of personal data may be subject to acts and regulations, such as the Health Insurance Portability and Accountability Act (HIPAA), the General Data Protection Regulation (GDPR), and/or other data privacy frameworks.

Given the distributed and microservice-oriented architecture of contemporary computer systems together with the volume, velocity, and amount of data being processed and/or consumed by various compute services and/or computer networks, compliance with such regulations presents significant technical challenges that may result in potential data loss, disruption of computing processes, denial of services, etc., on one hand, and potential risk of identity disclosure and/or other privacy risk on the other. In some further examples, some current best technical practices may be in contradiction with certain privacy requirements.

For example:

1. Data Normalization in data structures (e.g., relational database management systems (RDBMS), Not Only Structured Query Language (NoSQL) databases, etc.) links data in normalized tables using permanent indexes, such as (e.g., in a general sense) [User Identifier] which links Personal Data (such as user profile data including such information as name, address, etc.) with non-personal data (e.g., transactional data). In this case, [User Identifier] data may be referred to as a pseudonym and may act as a linking Quasi-Identifier, making the full transactional dataset Personal by linking the [User Identifier] all the way to the user's personal data. In other instances, [User Identifier] can be considered to be of a class of "Online Identifiers", which are considered in legal frameworks (e.g., GDPR) as Personally Identifying. GDPR also refers to some types of identifying data as pseudonyms through a pseudonymization process.

2. Data de-Normalization and Locality in NoSQL databases, on the other hand, in many cases directly groups all transactional data by Quasi-Identifying index, logically linking such quasi-identifier data to the Personally Identifying Information stored elsewhere in distributed computing system or architecture.

3. Service-oriented and Microservice architecture encourage free flow of data between systems, data duplication, and diffusion of various pieces of Personally Identifying information across the distributed system of loosely connected microservices. It should be noted that other systems beyond service-based and microservice based systems may link various pieces of PII to non-personal data, and may thus be face with similar problems.

In other words, some currently developed practices of the design of Information Systems may contradict the requirements of Privacy Regulations. In order to comply with at least some privacy regulations, strict control (tracking, retrieval, classification, deletion, retention, and expiration) of Personally Identifying Information (Personal Information) is required, whereas the current best practice of distributed microservice-based architecture (e.g., a container and/or other virtualized, distributed computer microservice) coupled with big data and analytics, encourage free, generally uncontrolled diffusion of Personal Data irrevocably commingled with transactional data. In order to satisfy both requirements of efficient information processing in modern Information Technology architectures and compliance with Privacy Regulation, a new mechanism is needed to dynamically separate the storage and handling of Enterprise Transactional Data from Personally Identifying Information.

FIG. 1 is a diagram illustrating an example of unlinked non-personal data and personal data in two example data structures, in accordance with various aspects of the present disclosure. In the example shown in FIG. 1, non-personal data represents enterprise data that is not linked to any natural person and is thus completely non-personal. Instead, the non-personal data represents various actions (e.g., movement of data or physical items, load (e.g., loading a delivery vehicle and/or loading data), save (saving data in a particular data store). Each of the actions is associated with a time and date and a transaction identifier that may uniquely identify the instance of the particular action.

FIG. 1 also depicts a Personal Data data structure. The data stored in this data structure may be entered by Natural Persons for the purpose of obtaining some service from the entity that stores the data (e.g., account creation, employment data, etc.) The personal data may be retained until the purpose for use of such data is fulfilled (e.g., until a particular transaction is completed, the account is expired, etc.). At this point, the personal data is required to be deleted or anonymized according to various data privacy requirements. The Person ID may be a quasi-identifier that may be considered as personal data (e.g., personally identifiable information (PII)) under certain privacy frameworks. The Non-Personal Data is unlinked with respect to the Personal Data in the example of FIG. 1, as there are no entries that can be used to link the two data structures.

FIG. 2 is a diagram illustrating data linking between personal and non-personal data through a linked dataset. In the example of FIG. 2, the Non-Personal Data is linked to the Personal Data after the assignment event by the process of adding common linking quasi-identifier (sometimes referred to as a "pseudonym" or user identifier data), identifying matching records in different data stores (or tables). The addition of the Person ID to the Non-Personal Data makes the data structure "Personalized, as this data can be used to determine personally identifiable information. The act of the linking makes the entire dataset considered as "Personal Data" by various legal frameworks.

FIG. 3 is diagram illustrating an example of the de-linking of personal and non-personal data. After Personal Data unlinking and/or deletion, if (as may be typical) Personal Identifiers previously associated with Personal Data, remain as part of the Non-Personal Data (as shown in FIG. 3), such Personal Identifiers may still constitute "Personal Data" within legal frameworks. For example, as shown in FIG. 3, although the name "John Smith" and the identifier data $P_1$ have been deleted from the Personal Data data structure (as indicated by the strikethrough), the Person ID remains in the Non-Personal Data data structure and may be used to infer information about the person (even though the person's name—John Smith—is no longer stored). In various examples described in further detail below, techniques are described that are effective to de-link the transaction data (e.g., the Non-Personal Data) from individuals (and their identifier data).

FIG. 4 is a diagram illustrating de-linking and anonymization of records of non-personal and personal data. In the example of FIG. 4, the quasi-identifier data (e.g., the Person ID $P_1$) has been deleted from both the Personal Data and Non-Personal Data (together with deletion of the person's name). Accordingly, the datasets are now completely anonymized for the removed record. For example, as shown in the Partially Anonymized Linked Dataset, there is no data linking transaction IDs 1 or 2 to any natural person since the first name, last name, and Person ID have been removed for $P_1$ from the Personal Data data structure.

While the practice in FIG. 4 may be used to alleviate privacy concerns and/or impermissible storage and/or retention of personal data, in practice there are issues with such an approach. First, field or attribute deletions in existing transactional data are destructive and may have unintended side effects if multiple datasets are connected using the same long-term identifier, which is suddenly deleted. Second, with a multitude of distributed, loosely-connected data stores, and data flows in contemporary massively-distributed systems operating on big data, it generally is extremely time and resource consuming and unreliable to trace and remove all instances and copies of such Quasi-Identifiers (e.g., identifier data, such as the Person IDs being used in the examples shown in FIG. 4), which get unpredictably diffused across the large scale (e.g., Enterprise) computing architectures. Third, different systems using the same data may have to comply with different time period retention requirements, and therefore may be required to trace and control the usage and deletion of such quasi-identifiers in time adding additional computational complexity to a system.

To alleviate these computational issues, described herein are systems and techniques for dynamic privacy-preserving data linkage across heterogeneous distributed microservice- and service-oriented computing architectures. The various systems and techniques described herein may generally be based on separation of non-personal data (e.g., Enterprise-generated transactional data) from Personal Data (e.g., personally-identifying information). In some further examples, the various systems and techniques described herein may employ dynamic temporary privacy-preserving data linkages between two classes of data for the period of the relevant relationship between the Enterprise and the human person. In various further examples, the various systems and techniques described herein may implicitly anonymize the non-personal data such that the non-personal data cannot be linked to a particular person. In still other examples, the various systems and techniques described herein may employ data tagging based on the record of processing activities (as detailed in the GDPR) and/or may use dynamic application of data retention and expiration schedules based on flexible retention rules that may be synchronized across a distributed computing system.

FIG. 5 is a block diagram illustrating an example system for dynamically generating privacy-preserving data linkages in distributed computing systems, in accordance with various aspects of the present disclosure. The distributed computing system data domain (e.g., a large Enterprise-scale computing system) is separated into logical zones (as represented by the dashed lines in FIG. 5) with the datastores that store strictly Non-Personal Data (e.g., transactional datastore 506—a data structure storing non-personal data) and the systems 508 processing non-personal data being logically separated from the datastores that store Personal Data (e.g., personal datastore 512 a data structure storing personally identifiable information (PII)) and the systems 510 processing personal data. Non-personal data and personal data form separate zones and never share any common identifiers (as described in further detail below). Therefore, according to the illustrated architecture, it may be impossible to create a linkage or join between types of data residing in separate zones (e.g., the Personal Data zone and the Non-Personal Data zone). Mapping between Personal and Non-Personal Data happens dynamically for the duration of relevant relationship (e.g., between an Enterprise and a Person) using a separate architectural entity mapping authority 502, which may be considered an analogue of a Certificate Authority in secure computer-based communication. Mapping authority 502 generates temporary mapping on demand between non-personal data (e.g., transactional data) and personal data, which may be maintained by the mapping authority 502 in a valid state for the duration of the trust relationship. Mapping authority 502 may return not only the mapping between personal and non-personal data, but also the materialized view without any linking identifiers (such as in FIG. 2, where the person IDs need not be present in the linked dataset; indeed, transaction IDs may also not need to be present). At the end of the relationship, when the personal data must be de-linked (as required by the relevant privacy regulations), and de-identified, the mapping authority 502 deletes the link between non-personal data and personal data (as described in further detail below). Accordingly, such linkages between non-personal data and personal data are transient in nature. The advantage of this approach is that most of the systems would not have to devise their own data retention/deletion policy and/or strategy, which could be resource intensive, prone to errors risking non-compliance, and—if data is deleted inadvertently—could cause system outages.

Using the architecture in FIG. 5, non-personal data (e.g., transactional datastore 506 describing individual actions) never stores common identifier data with the personal data store 512. Instead, the non-personal data stored in transactional datastore 506 may only store multiple anonymized (e.g., cryptographically random) linking identifiers (e.g., transient identifier data) generated by mapping authority 502. Unlike the quasi-identifier data (e.g., the Person IDs) described above in reference to FIGS. 2, 3, and 4, none of the transient identifier data links to any personal data outside of the mapping authority. Additionally, the transient identifier data are regularly and irrevocably de-linked from personal data (e.g., they expire) according to the relevant data retention schedule.

Personally Identifiable Information (data) is stored in a limited set of systems (e.g., the "Personal Data" area isolated by dashed lines on FIG. 5) isolated behind the Mapping Data Layer, and is only available for short-term processing (by systems 504 which process but which are not permitted to store personal data) by transient processing systems via the mapping authority 502 (e.g., to retrieve a list of users and display the list on a screen). Personally Identifiable Information records have record identifiers (identifier data—sometimes referred to as "pseudo-identifiers" or "quasi-identifiers") that are exposed to the mapping authority 502, and the Transient Processing layer, but never propagated to the Transactional (Non-Personal) Data layer. Various computing devices (e.g., gateway devices) may control access to each of the logically separated partitions shown in FIG. 5. For example, among the systems 510 processing personal data 510 there may be one or more computing devices controlling access to the personal datastore 512. Similarly, among the systems 508 processing non-personal data there may be one or more computing devices controlling access to transactional datastore 506.

The Mapping Data Layer is the system mapping operational relationships between Non-Personal (Transactional) Data systems 508 (including transactional datastore 506), systems 510 processing personal data (including personal datastore 512), and Transient Processing systems (including systems 504). The mapping authority 502 acts as a privacy controller and ensures that the relevant privacy policies, such as the appropriate data retention period, are applied. Mapping Authority 502 is a core service/system that generates a temporary temporal mapping between the personal data record pseudonym (Quasi-Identifier or other identifier data), and a temporary pseudo-anonymized transient identifier that marks a set of transactions associated with a specific person at a specific period in time, and that is linked by the mapping authority 502 to the Personal Data Quasi-identifier (Pseudonym) during the period of the relationship between the Person and the Enterprise, and that is irrevocably de-linked by the mapping authority 502 when such relationship expires. Therefore, during the relationship period, the transient identifier data acts as a component of a quasi-identifier, and after the relationship period, it becomes a grouping attribute of a subset of transactions (as shown in various examples below).

The Transient Processing Layer includes the systems 504 that are permitted to process, but not store long term, a mix of personal and non-personal data. Examples of such systems may be a user interface that logs in a user, then looks up the relevant user profile via the mapping authority 502 from the personal datastore 512, then requests association to user-related transactions from the transactional datastore 506, and displays the data to the user. Such systems may store the mix of such data in a short-term cache, which is cleared short term before the storage of personal data becomes liable in the privacy regulation sense.

To accomplish dynamic privacy-preserving separation and linkage of non-personal transactional data with personal data, interim usage of transient identifier data that temporarily link personal and non-personal data with privacy preservation is described herein.

The transient identifier data generally comprises a cryptographically random value. Depending on the implementation, pseudo-random or partially ordered sequences may be used. Also, deterministic prefixes or suffixes may be added for Enterprise- or system-specific data, such as system identifier or version. The critical point is that the random part of the transient identifier does not allow inference of any information about the data subject (e.g., the human person).

New transient identifiers may be generated on a regular basis and may be associated with the personal data via the identifier data that identifies a user record by the mapping authority 502. Frequency of transient identifier generation depends on the implementation and particular use case, and in a border case, may be generated per each new transaction, making it practically anonymous, since each transaction can be inferred to be different from any other transaction by general characteristics (e.g., timestamp and purpose), and adding a random value to each transaction does not add any new knowledge or information to the record.

Figure 6:
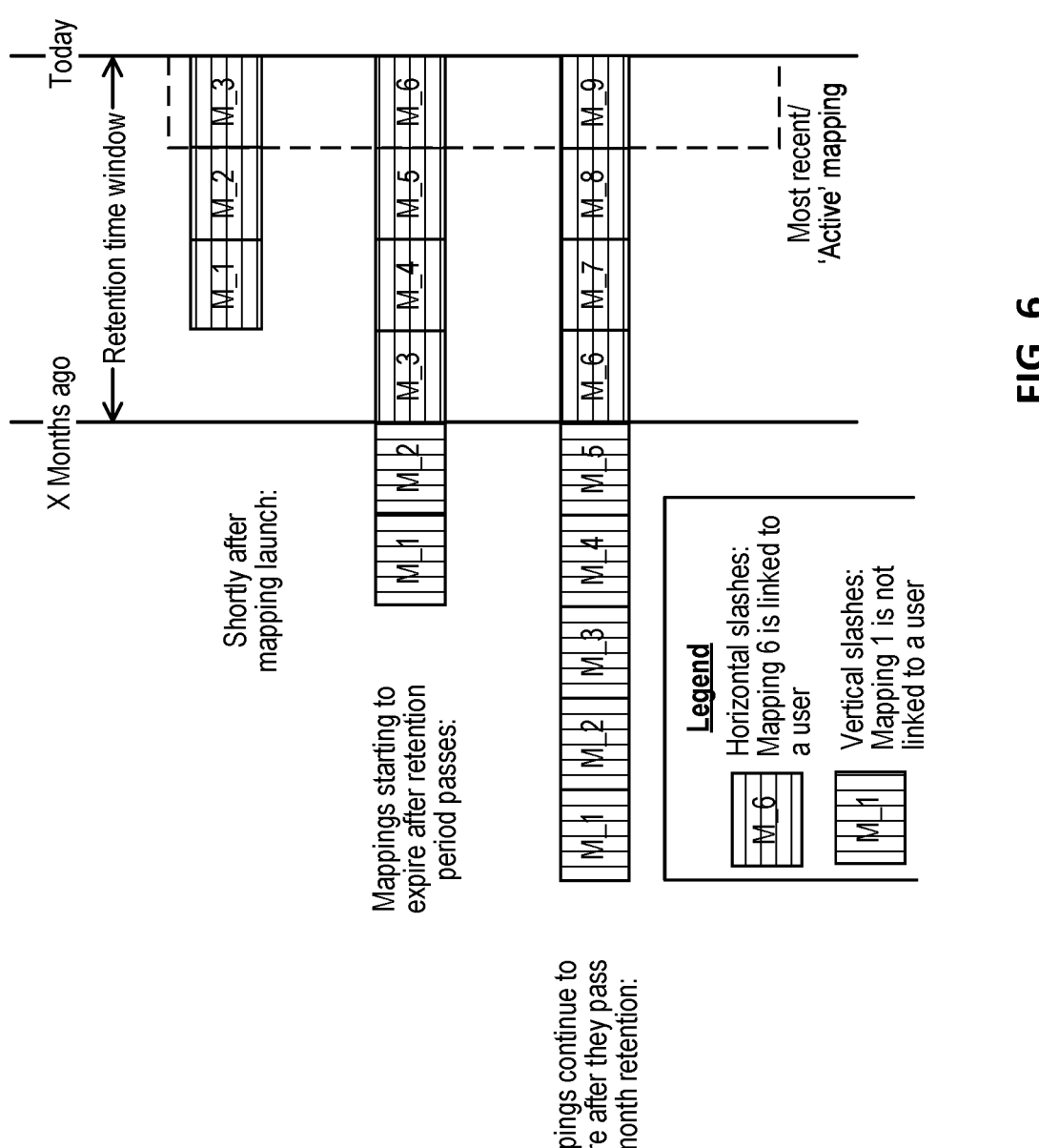
FIG. 6 illustrates an example of time-dependent transient identifiers that may be used in accordance with various aspects of the present disclosure.

FIG. 6 illustrates an example of time-dependent transient identifiers that may be used in accordance with various aspects of the present disclosure. The most-recently generated transient identifiers are considered as Active or Current. The set of transient identifiers generated for the data subject (User) mapped via identifier data (e.g., a user identifier code) during the operational period of a data record, may be considered as operational or "In Use." Transient identifiers generated at a time before the end of the moving retention period time window may be considered as expired and may be deleted (e.g., unlinked and/or unmapped) from the identifier data by the mapping authority 502. Retention Periods (Time Window) may be different for various data processing purposes for the same records (according to the Privacy Policy), therefore, during operational state of the record, the Retention Time window may be calculated and applied based on the privacy policy and enforced via purpose-based and/or usage-based access control. In the example of FIG. 6, those transient identifiers with vertical slashes may be expired (and the linkage between such expired identifiers and the identifier data (e.g., the quasi-identifiers) may be deleted by the mapping authority 502). Conversely, in the example of FIG. 6, the transient identifiers with horizontal slashes may be unexpired and thus the mapping authority 502 may maintain a linkage/mapping between each transient identifier and identifier data (e.g., the quasi-identifiers). This mapping may be used to associate non-personal data (e.g., transactional data) with personal data while the mapping remains valid/unexpired.

Figure 7:
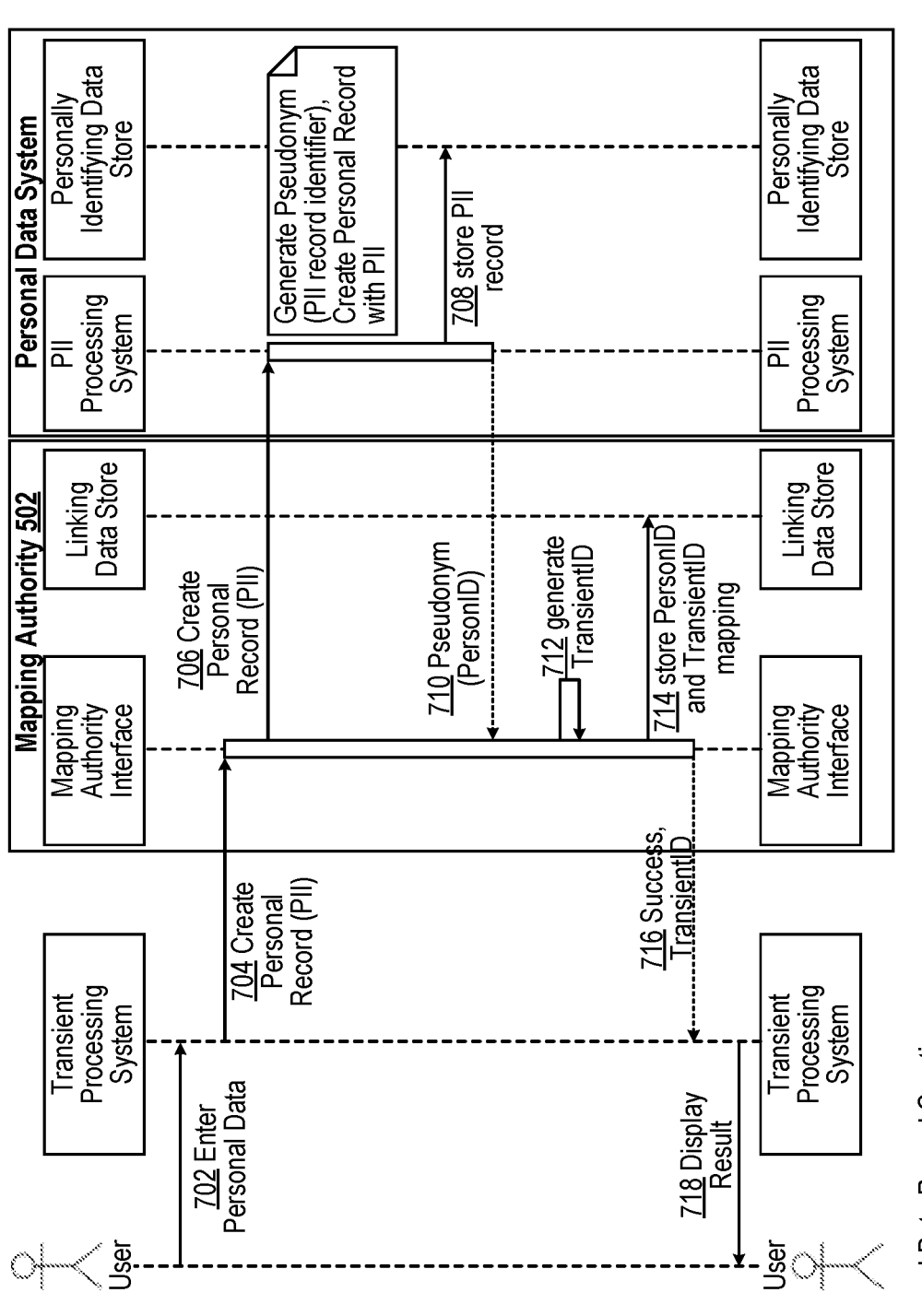
FIG. 7 is a timing diagram illustrating generation of a privacy-preserving data linkage for personal data, in accordance with various aspects of the present disclosure.

FIG. 7 is a timing diagram illustrating generation of a privacy-preserving data linkage for personal data, in accordance with various aspects of the present disclosure. At action 702 of FIG. 7 a user enters personal data (e.g., name, address, email, etc.) into a transient processing system (e.g., a user interface, portal, etc.). At action 704, the transient processing system initiates a record creation request by passing the personal data to the mapping authority 502. The mapping authority, at action 706, passes the request to the personal data system. At action 708, the personal data system may generate a record for the personal data and may associate the record with a pseudonym (e.g., identifier data, such as a code that identifies the personal data) and may store the PII record in the personally identifying data store.

At action 710, upon creation of the record, the personal data system may return a successful response with the personal identifier data (e.g., the pseudonym, such as a Person ID) to the mapping authority 502. At action 712, the mapping authority 502 may generate transient ID data (e.g., a cryptographically random number). At action 714, the mapping authority 502 may store the pseudonym data (e.g., the Person ID) in a data store in association with the transient ID data, creating a mapping between the transient ID and the pseudonym. At action 716, the mapping authority 502 may return a message indicating that the record (e.g., an account) was successfully created, the message may include the transient identifier data. At action 718, the result (e.g., successful creation of the user record) may be returned to the user and/or displayed on a display of the user's device.

It should be noted that the flow depicted in various timing diagrams depicted herein may be modified according to the desired implementation. For example, in FIG. 7, instead of passing the request to enter personal data through the mapping authority 502, the personal data may be sent directly to the personal data system. The personal data system may send the pseudonym (e.g., quasi-identifier data) to the mapping authority. The mapping authority 502 may generate the transient ID, store the pseudonym (e.g., the PersonID) in association with the transient ID in the linking data store, and may return the success message with the transient ID to the user.

Figure 8:
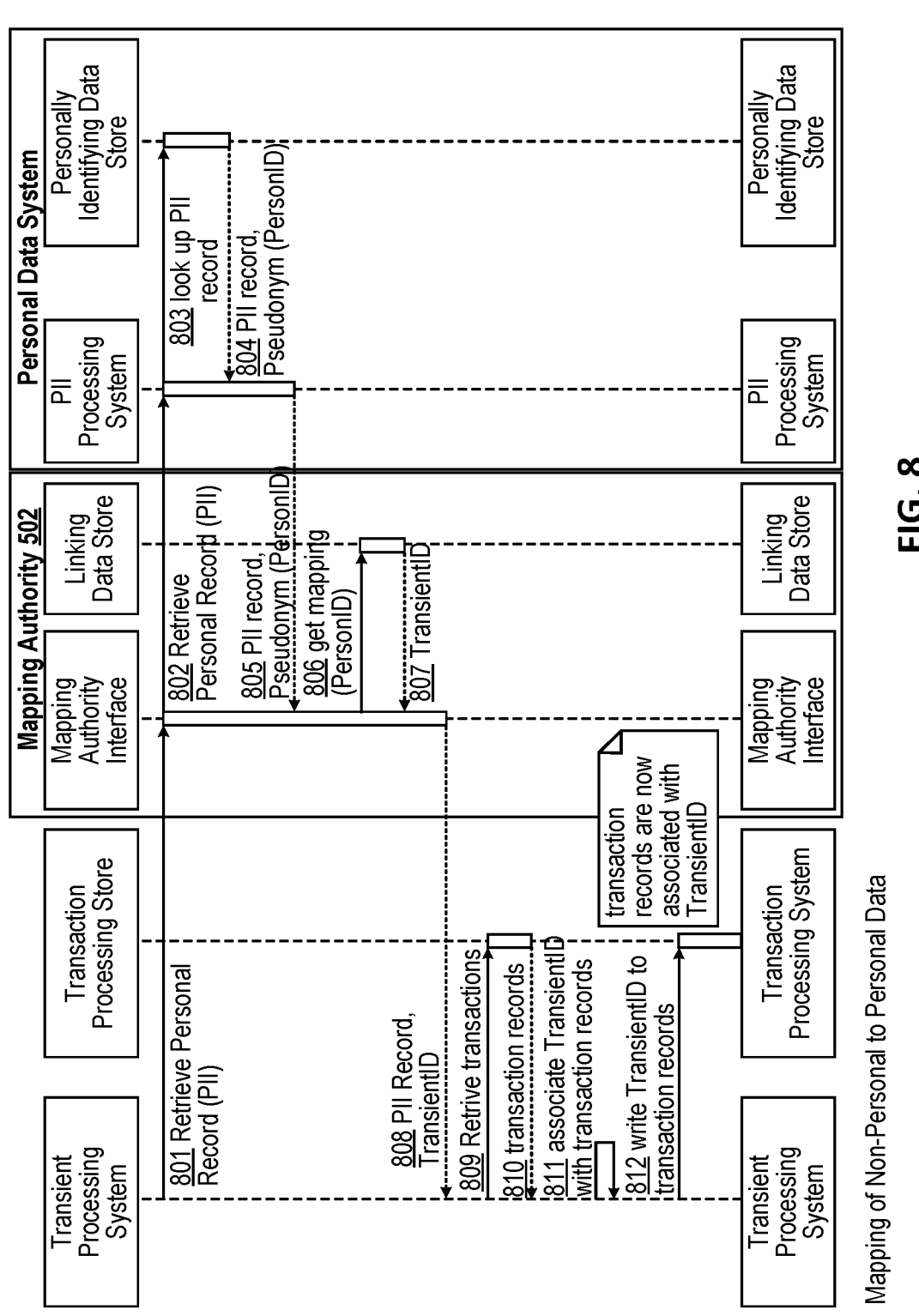
FIG. 8 is another timing diagram illustrating generation of a mapping between transient identifier data and non-personal data, in accordance with various aspects of the present disclosure.

FIG. 8 is another timing diagram illustrating generation of a mapping between transient identifier data and non-personal data, in accordance with various aspects of the present disclosure. At action 801, the transient processing system may query the mapping authority 502 for personal data using various attributes (e.g., name and address). At action 802, the mapping authority 502 may forward the query to the personal data system. At action 803, the personal data system may lookup the data in the personally identifying data store. At action 804, the personal data system may locate the data record and may return the record (e.g., the PII) together with the identifier data (e.g., the Person ID) to the mapping authority 502. At action 805, the data record is returned together with the identifier data. At action 806, the mapping authority 502 may query its logical mapping data structure using the Person ID to determine the transient ID.

At action 807, the transient identifier may be sent from the mapping authority 502 to the transient processing system. At action 808, the personal data that is the subject of the request may be returned to the transient processing system with the transient ID. At action 809, the transient processing system may retrieve relevant transactions from the transaction processing system using the transient ID. At action 810, the set of transactions may be returned from the transaction processing store. At action 811, the transient processing system may associate transactions with the related person using the transient identifier. At action 812, the transaction records may be updated with the transient ID to create the transient mapping of transactional data to the personal data.

In another example implementation, the transient processing system may send a transient ID to the personal data system. The personal data system may send the transient ID to the mapping authority 502 which may return the PersonID to the personal data system. The personal data system may use the PersonID to lookup the PII and may return the PII to the transient processing system (if unexpired). In this example implementation, the mapping authority 502 may be queried only with quasi-identifiers (e.g., Person IDs) or with transient IDs and not with any underlying PII. This implementation prevents the mapping authority 502 from direct access to PII.

Figure 9:
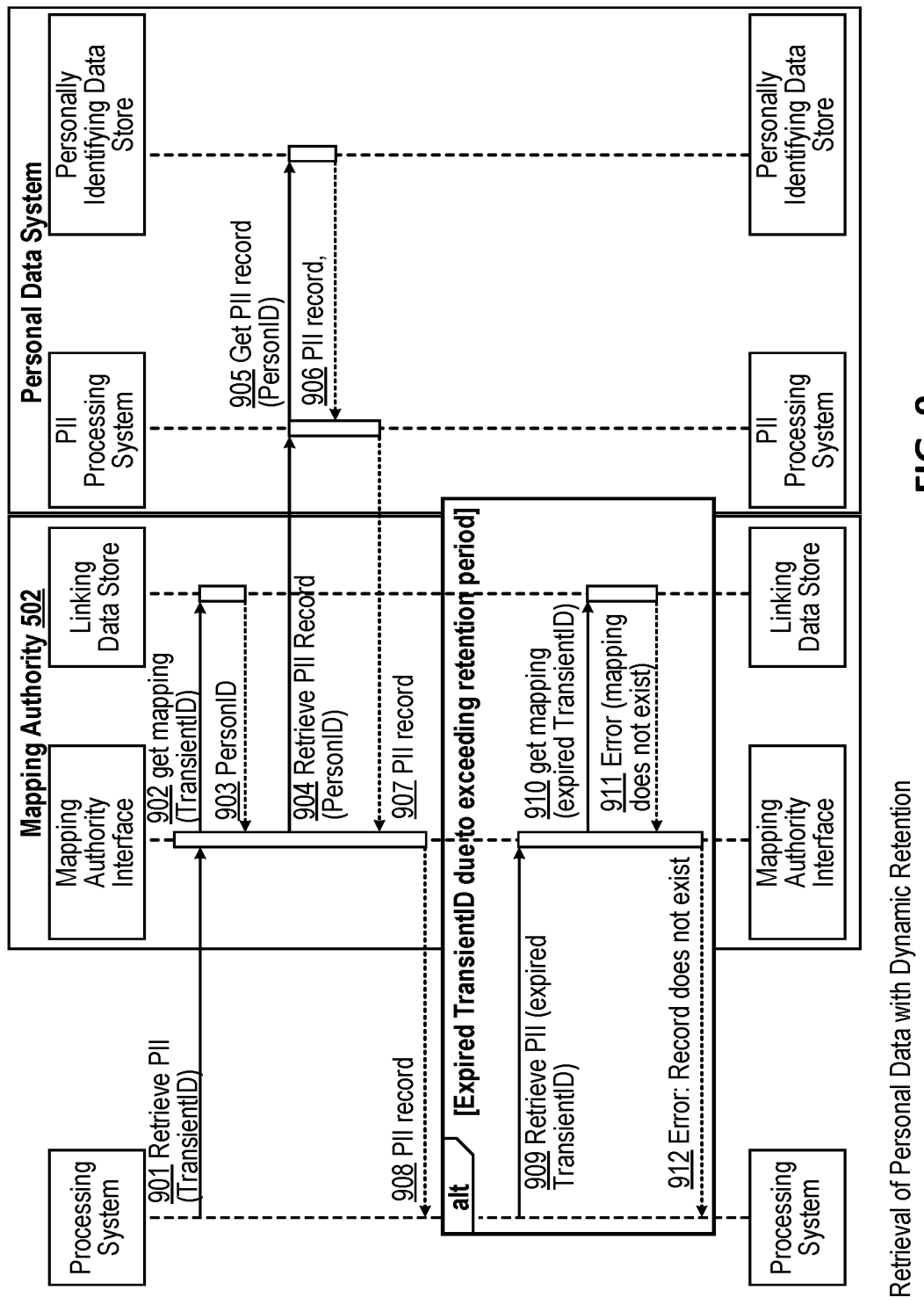
FIG. 9 is another timing diagram illustrating a retrieval of personal data using transient identifier data, in accordance with various aspects of the present disclosure.

FIG. 9 is another timing diagram illustrating a retrieval of personal data using transient identifier data, in accordance with various aspects of the present disclosure. Any processing system, at action 901, may query the mapping authority 502 for personal data using a transient identifier. At action 902, the mapping authority 502 may query the mapping (e.g., the data structure maintained by the mapping authority 502) to determine the identifier data (e.g., the Person ID) corresponding to the transient ID. At action 903, since the mapping has not yet expired, the identifier data (e.g., the Person ID) may be returned by the mapping authority 502. At action 904, the mapping authority 502 may send a retrieval request including the Person ID (the identifier data) to the Personal Data System.

At action 905, the data record may be queried from the Personal Data Store using the Person ID. At action 906, the record with the personal data may be returned to the PII processing system. At action 907, the record with the personal data may be returned to the mapping authority 502. At action 908, the mapping authority 502 may return the personal data record to the processing system.

Alternatively, at action 909, if an expired transient ID is used (e.g., a transient ID associated with a time-to-live (TTL) value that has expired), the expired transient ID may be sent by the processing system to the mapping authority 502. The mapping authority 502, at action 910, may query the mapping to determine the Person ID (the identifier data stored by the mapping authority 502 in association with the expired transient ID). However, since the transient ID has expired, at action 911, an error may be returned since the mapping has expired due to an exceeded retention period. At action 912, the mapping authority 502 may return the error to the processing system which may indicate that the requested PII does not exist.

Figure 10:
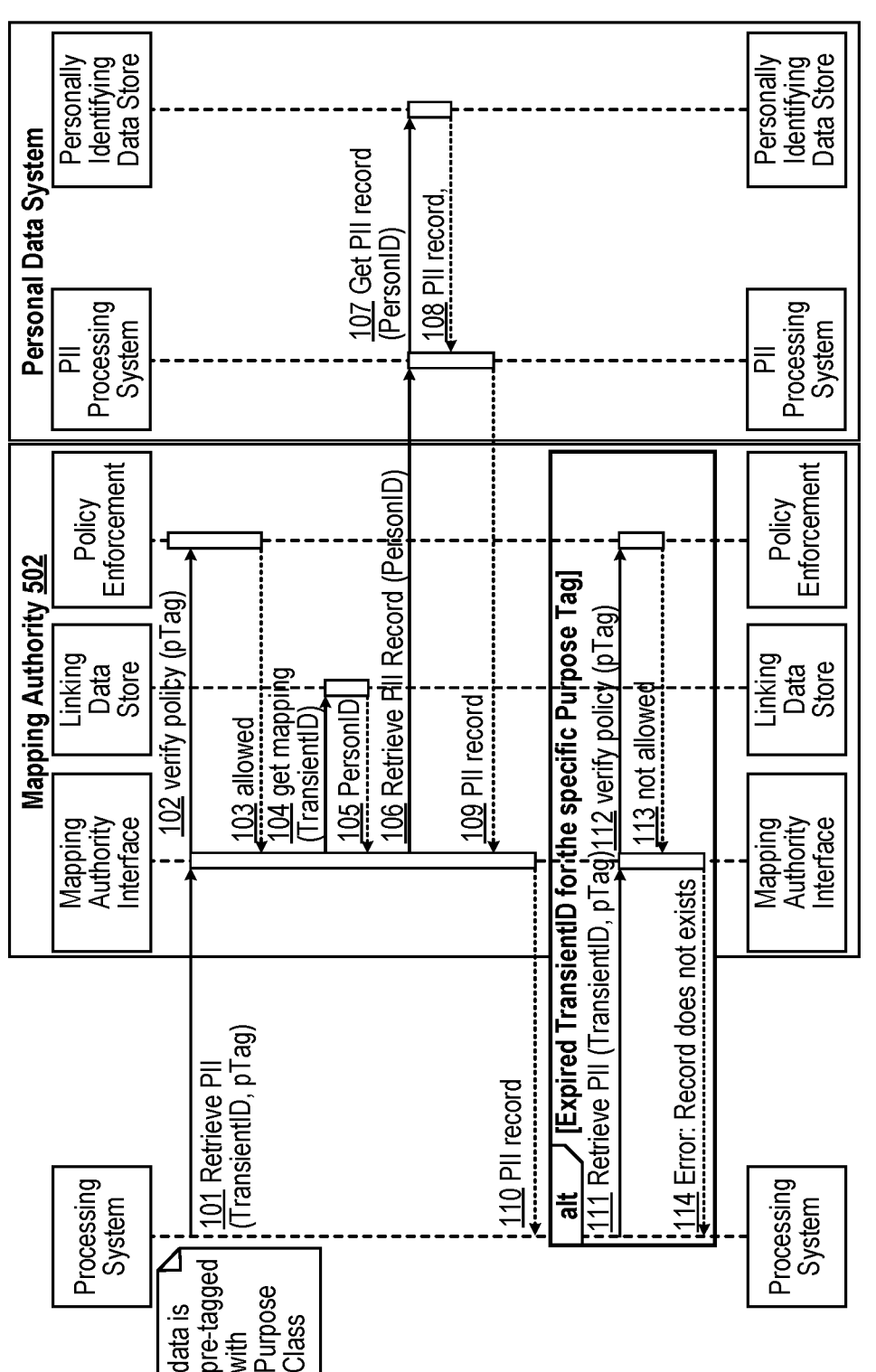
FIG. 10 is another timing diagram illustrating retrieval of personal data using transient identifier data and usage-based access control data, in accordance with various aspects of the present disclosure.

FIG. 10 is another timing diagram illustrating retrieval of personal data using transient identifier data and usage-based access control data, in accordance with various aspects of the present disclosure. At action 101, the processing system is assigned a policy tag mapped to the intended purpose of the information processing (e.g., due to an encoded policy, as described in further detail below). At action 102, the processing system queries the mapping authority 502 for personal data using a transient identifier and a purpose tag (e.g., pTag data). At action 103, the mapping authority 502 may query the policy enforcement services with the pTag. At action 104, since the policy in the current example indicates that processing of the transactional data is permitted for the pTag (e.g., the retention period has not been exceeded, according to an expired TTL value of the mapping), the policy allows the mapping of the transactional data to the personal data.

At action 104, the mapping authority 502 sends a retrieval request that includes the transient identifier to the linking data store. At action 105, the personal identifier (e.g., Person ID) is returned from the linking data store. At action 106, the mapping authority 502 queries the PII processing system using the personal identifier. At action 107, the request may be forwarded to the personally identifying data store and at action 108, the PII record may be returned to the PII processing system.

At action 109, the record with the personal data (e.g., the PII record) may be returned to the mapping authority interface. At action 110, the mapping authority 502 may return the personal data record to the querying processing system.

Alternatively, at action 111, the processing system may query the mapping authority 502 for personal data with the pTag for which access should be denied (e.g., the retention period is exceeded for the specific purpose defined in the pTag). At action 112, the mapping authority may query the policy enforcement service with the pTag. At action 113, since the policy indicates that the mapping to personal data is not allowed for the pTag (e.g., due to the allowed processing period being exceeded for the specific purpose defined in the pTag (and as determined using the TTL for the transient ID). At action 114, the mapping authority 502 may return the error indicating that the related PII record does not exist.

Figure 11:
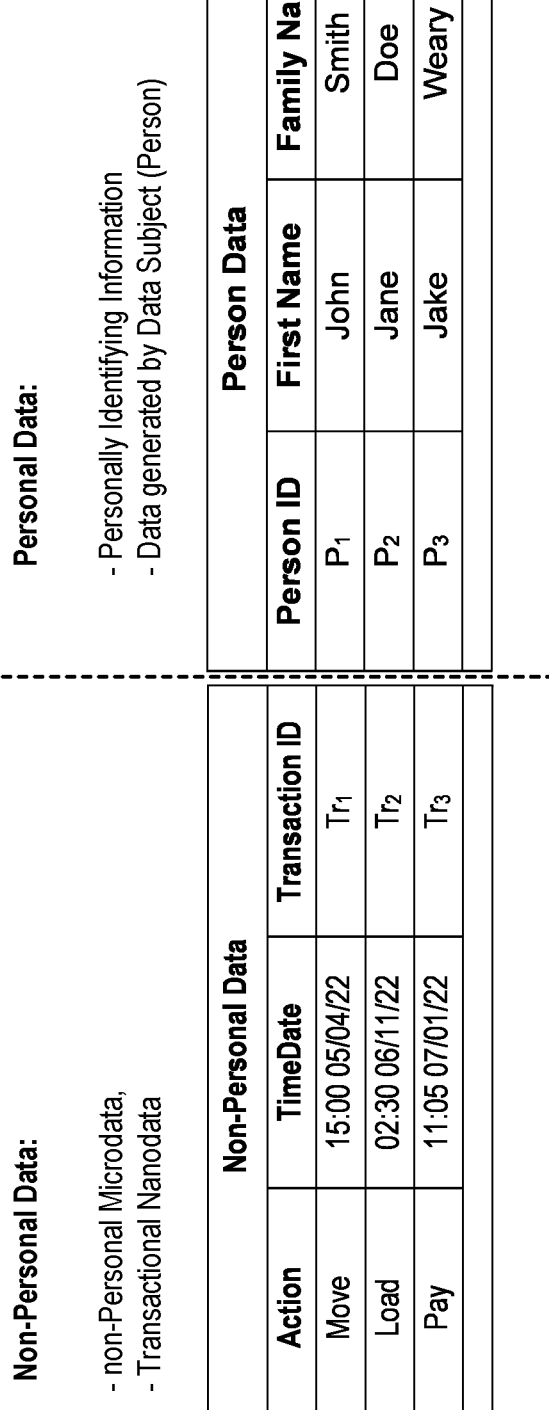
FIG. 11 depicts another example of unlinked non-personal data and personal data in two example data structures, in accordance with various aspects of the present disclosure.

FIG. 11 depicts another example of unlinked non-personal data and personal data in two example data structures, in accordance with various aspects of the present disclosure. As shown, the non-personal data (e.g., transaction data) and the personal data are not linked in any way between the two tables shown in FIG. 11.

Figure 12A:
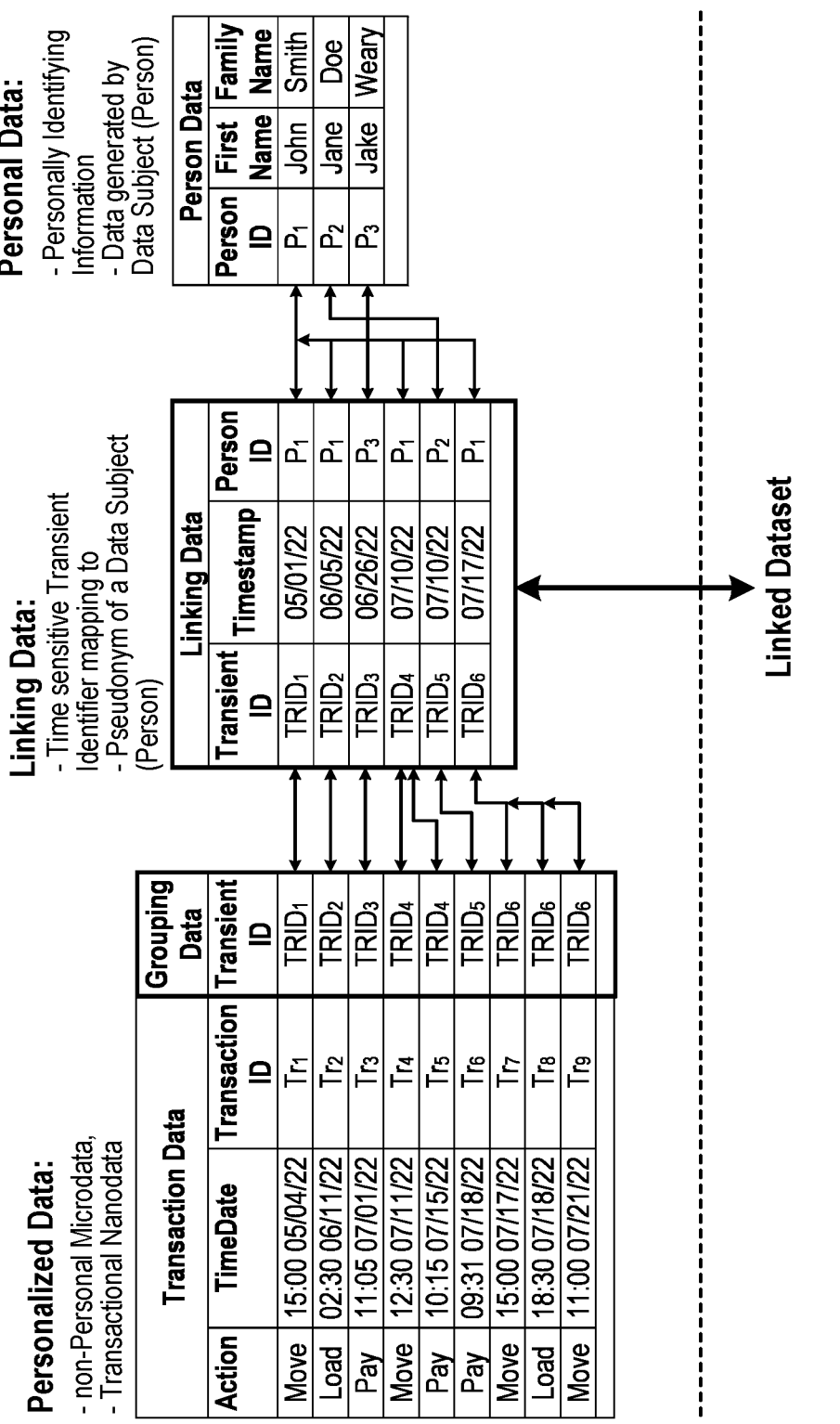
FIGS. 12A-12B depict linking of non-personal data and personal data using transient identifier data, in accordance with various aspects of the present disclosure.
Figure 12B:
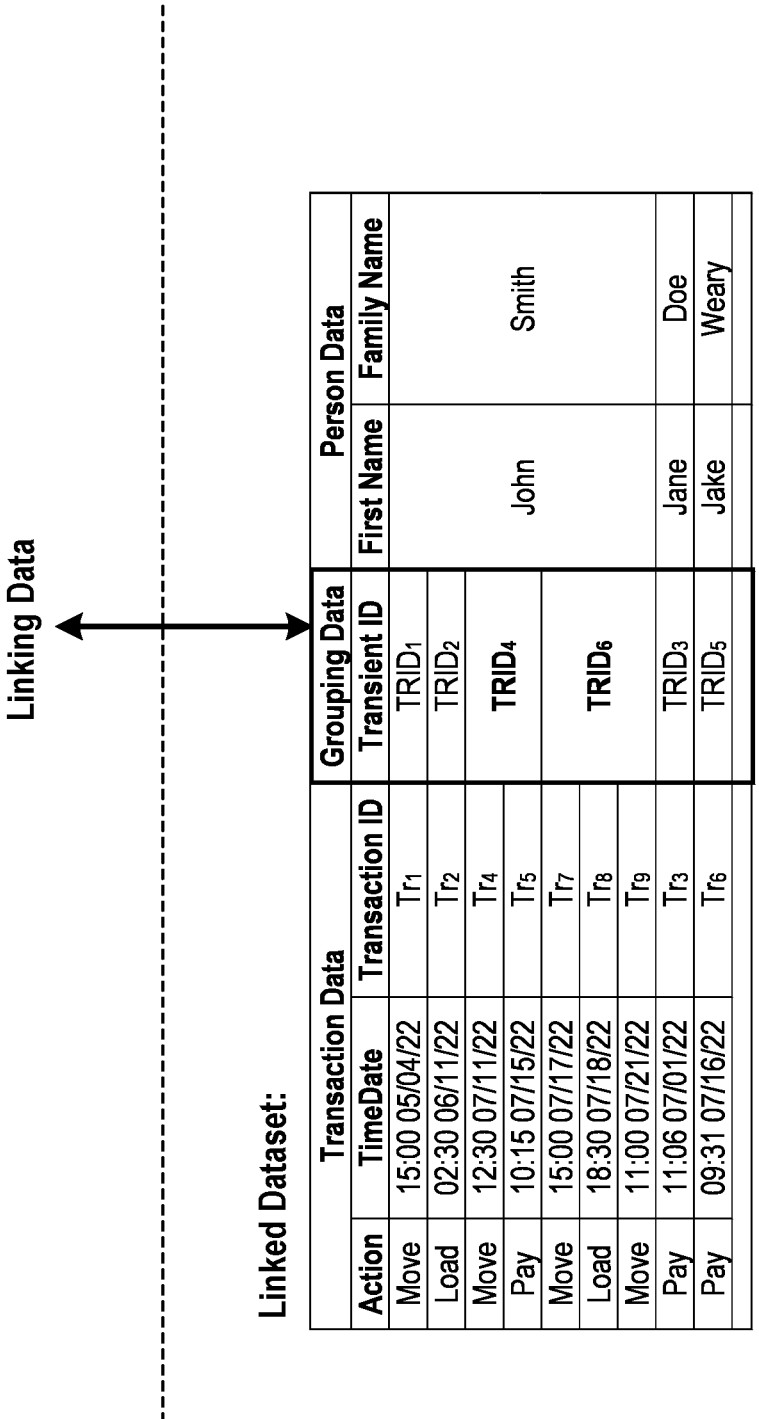

FIGS. 12A-12B depict linking of non-personal data and personal data using transient identifier data, in accordance with various aspects of the present disclosure. In FIG. 12A the linking data data structure may be maintained by the mapping authority 502, while the transaction data may be "personalized" while the transient IDs are valid since the linking data links the transient IDs to a Person ID, which is, in turn, linked to PII in the Personal Data data structure. As described herein, processing systems may not have direct access to the personal data and may be required to access personal data using the mapping authority 502. FIG. 12B displays a linked dataset that is formed by combining the personalized data from FIG. 12A with the personal data using the linking data. The linking data data structure maintained by the mapping authority 502 may be any type of data structure (e.g., RDBMS, NoSQL, etc.).

While Personal Data uses the generated pseudonym (e.g., Person ID), the linkage happens via interim linking between the time-sensitive temporary transient ID and the Pseudonym. A transient identifier is assigned to the relevant time-bound groups of transactional (Non-Personal) data. The pseudonym (e.g., $P_1$, $P_2$, etc.) is never exposed to transactional data, and the transient identifier is never written to Personal Data.

FIGS. 13A-13B depicts de-linking of non-personal data and personal data based on expiration of transient identifier data, in accordance with various aspects of the present disclosure. In the example depicted in FIG. 13A, the transient IDs $TRID_1$, $TRID_2$, and $TRID_3$ may have expired (as the TTL values for these transient IDs may have been exceeded since their timestamps). Accordingly, the mapping authority 502 may delete these entries from the linking data data store. Accordingly, as shown in FIG. 13B, the expired transient IDs no longer link to any PII.

FIGS. 14A-14B depicts full anonymization after user personal data deletion, in accordance with various aspects of the present disclosure. When a user requests personal data deletion, the PII may be deleted from personal data as well as the pseudonum (e.g., identifier data). In turn, mapping authority 502 may delete any linking data that relates to the pseudonym (e.g., the Person ID). For example, in FIG. 14A, John Smith has requested that his PII record be deleted. Accordingly, the personal data record including his name and identifier data ($P_1$) may be deleted. The mapping authority 502 may delete all records in the linking data data store associated with the identifier data ($P_1$). In the example, these are the records with $TRID_1$, $TRID_2$, $TRID_4$, and $TRID_6$. Accordingly, in the partially anonymized dataset shown in FIG. 14B, there is no personal data associated with transient IDs $TRID_1$, $TRID_2$, $TRID_4$, and $TRID_6$. Additionally, in this example, there is no quasi-identifier data remaining for the user requesting deletion of the personal information in any database (e.g., no database stores the Person ID $P_1$ following the deletion request).

A central requirement of evolving privacy regulation for distributed computer systems is the implementation of a complex deletion and retention policy based on the confluence of multiple legal frameworks and regulations dependent on operational territory of an entity, type, and purpose of the personal data generated and processed by the entity, and constantly changing and evolving privacy regulations.

An additional problem is posed by the structure of legal privacy requirements splitting the purpose of data processing and storage and enforcing the principle of data minimization. This means that the same data may need to be deleted and retained differently by different systems and units within the enterprise data architecture depending on the specific purpose of the processing.

The various techniques and systems for dynamic privacy preserving data linkage in distributed computing systems addresses these concerns in various ways. For example, the systems and techniques described herein implement universal encoding of a deletion and retention policy accounting for the time evolution (versioning), various purpose of the information processing and storage, and flexible additional conditions influencing deletion and retention periods. In still other examples, the systems and techniques described herein synchronize data retention and deletion (and usage based access control) policies across the distributed microservices/service-oriented architecture web. Further, the policies are enforced by placing the control point in the mapping authority data layer. In various further examples, fine-grained time-sensitive and/or purpose-sensitive control of retention, deletion, and access at the logically centralized mapping authority 502 is provided by regulating access to linking data. Additionally, the various systems and techniques discussed herein enable enforcement of purpose-based and/or usage-based access control by the logically centralized mapping authority 502.

Figure 15:
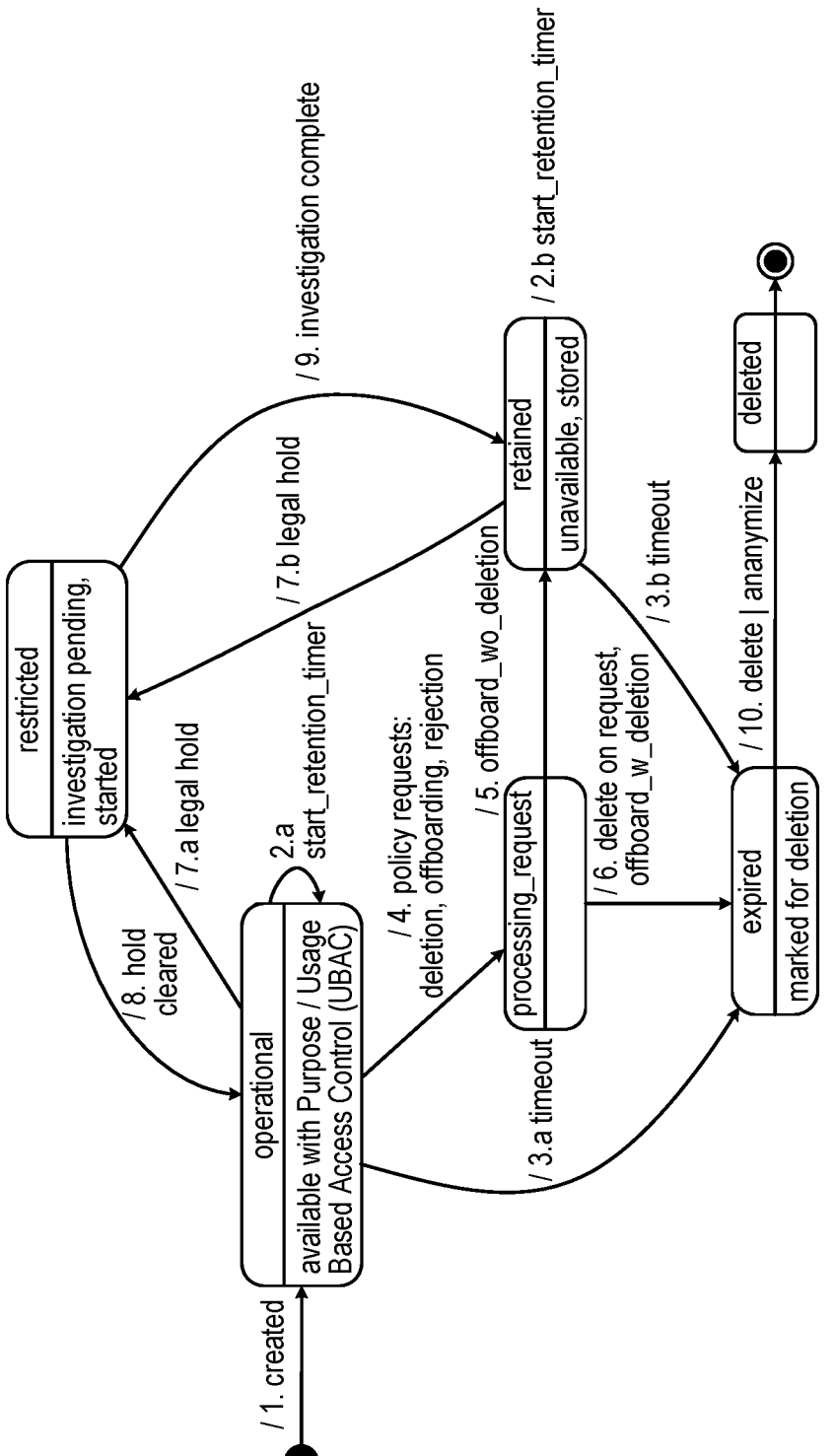
FIG. 15 depicts a state diagram illustrating an example life cycle for a personal information record, in accordance with various aspects of the present disclosure.

FIG. 15 depicts a state diagram illustrating an example life cycle for a personal information record, in accordance with various aspects of the present disclosure. A record including and/or linked to PII generally passes through the various states depicted in FIG. 15 during its lifecycle, when subjected to a purpose-based and/or usage-based access control policy. At state 1, the record is created and enters the operational state, when the personal information is available to other systems for processing subject to purpose/usage-based access control policies.

If the record is subject to time-based deletion (e.g., a finite retention period), then the logical retention timer may be started (2). Upon timeout (3) (e.g., when the retention period is exceeded), the record transitions to the expired state, where it is marked for deletion at the specific date. On a reception of a privacy policy event (4) (e.g., On Demand deletion, account offboarding, or account rejection, etc.), the processing_request state is entered, where the record purpose and zero or more sub-purposes are evaluated against the privacy deletion and retention policy, and the deletion decision is calculated.

If (5) offboarding without deletion result is calculated, then the record enters into the retained state, where it is unavailable for processing, but is stored according to the retention policy, retention timer is also started (2b). At (6), if the deletion on request result is calculated, then the record enters the expired state and is marked for deletion. At (7), if at any time in the operational or retained states, a legal hold is put on the data, the data enters into the restricted state subject to the requirements of the hold. At (8), depending on the result of the investigation, the record can be cleared and returned back to the operational state. Alternatively, at (9), the record can be placed into the retained state, where it is not operational or available, and is subject to the retention period. At (10), a deletion or equivalent anonymization process deletes or anonymizes all records with the appropriate (exceeded) TTL value/retention period and transitions records into the deleted state, where they are no longer subject to privacy regulations.

Figure 16:
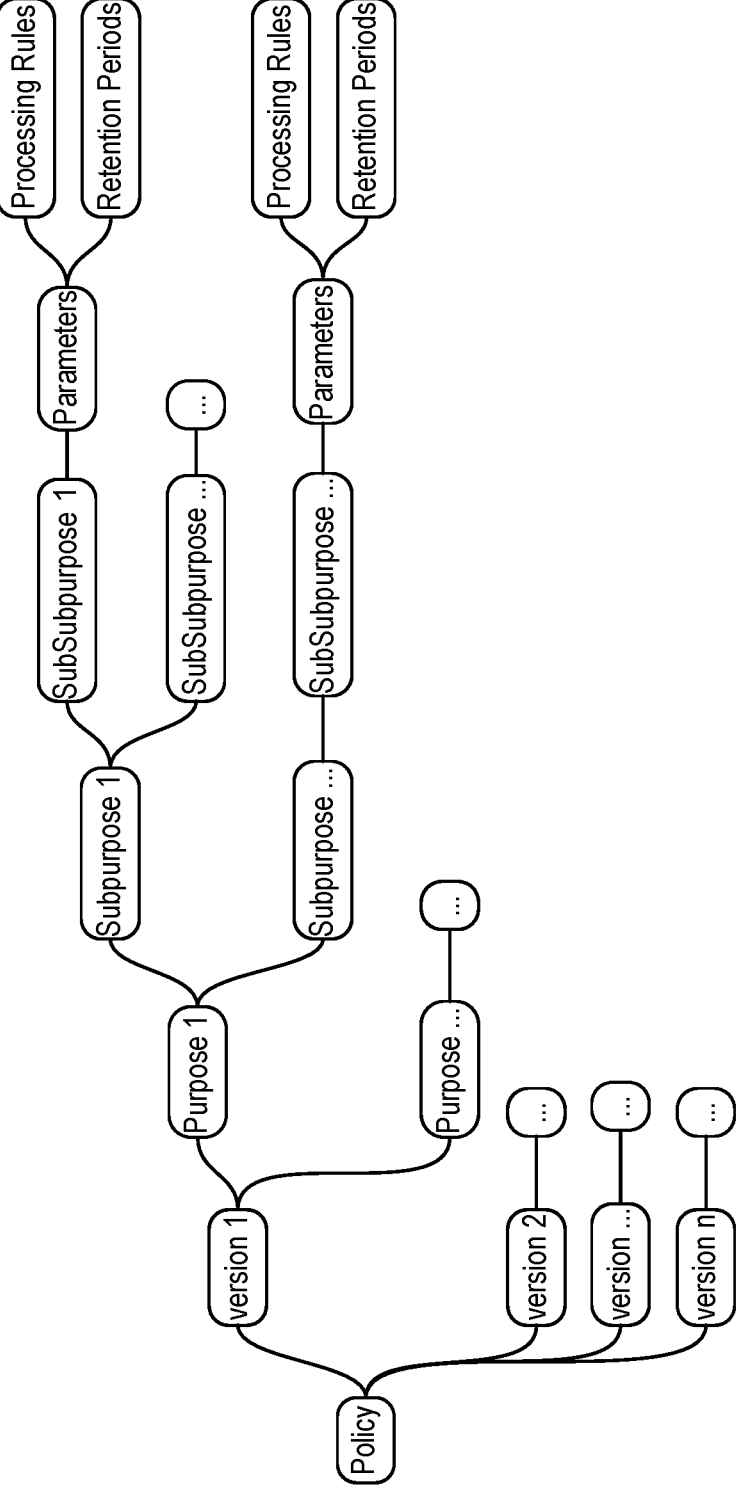
FIG. 16 depicts an example encoding structure for a privacy-preserving deletion and retention policy, in accordance with various aspects of the present disclosure.

FIG. 16 depicts an example encoding structure for a privacy-preserving deletion and retention policy, in accordance with various aspects of the present disclosure. In an example, an information purpose, usage, access, deletion, and/or retention policy may be encoded in a graph data structure (e.g., a tree-like directed acyclic graph (DAG), but connections between nodes are also possible). Each version of a given policy may be keyed by an information usage purpose, further detailed with sub-purposes, and other details, such as processing or storage, various additional parameters, and end with the encoding of processing rules. Processing of such a policy encoding may be performed by a policy enforcement component in an on-demand fashion and may result in a generation of a deletion or retention decision with related retention period or date relative to the processing point in time.

Figure 17:
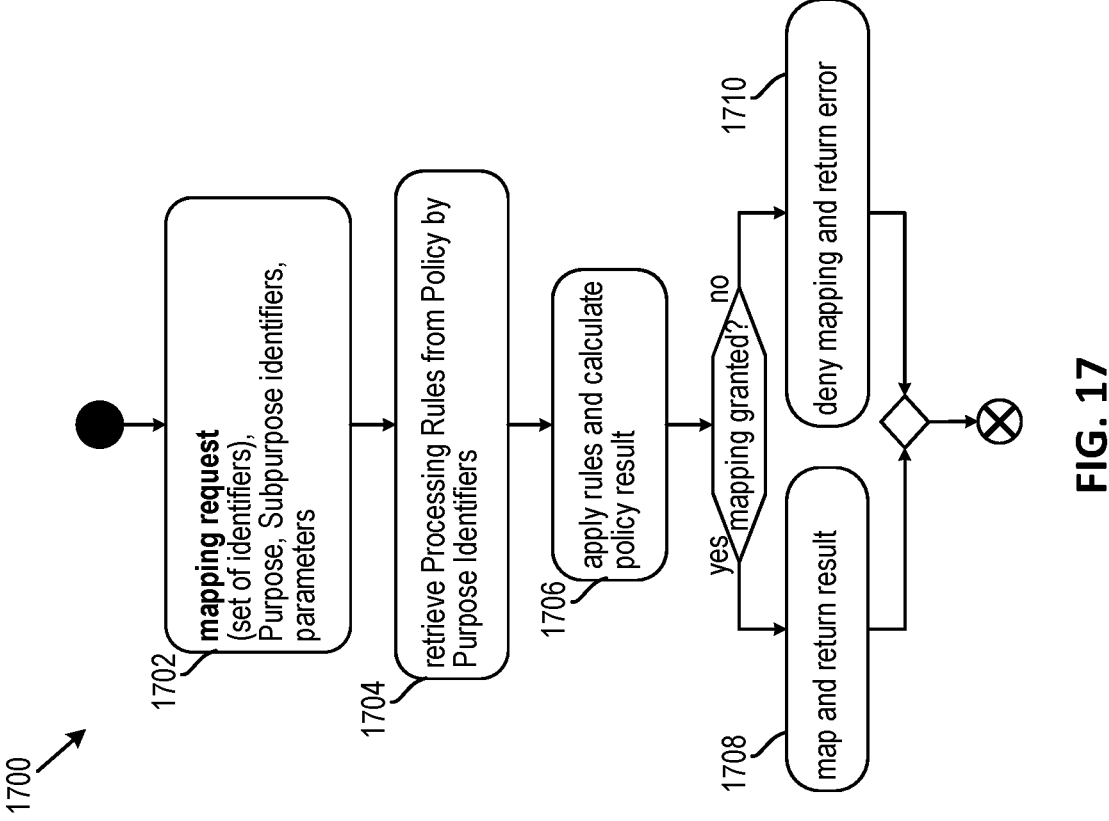
FIG. 17 depicts example mapping and access control processing based on a privacy deletion and retention policy, in accordance with various aspects of the present disclosure.

FIG. 17 depicts example mapping and access control processing based on a privacy deletion and retention policy, in accordance with various aspects of the present disclosure. The actions of the process 1700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 1700 may begin at action 1702, at which a mapping request may be sent (e.g., by a processing system to map particular non-personal data (e.g., transactional data) to a particular user. Various identifiers may be provided with the mapping request (e.g., a purpose of the request, various subpurpose identifiers and/or parameters, etc., depending on the particular implementation).

Processing may continue at action 1704 at which processing rules may be retrieved for the policy using the purpose identifiers. At action 1706, the policy may be applied and the policy result may be determined. If a mapping is granted, the map result may be returned at action 1708. Conversely, if the mapping is denied (e.g., due to invalid purpose and/or expired retention time window, an error result may be returned at action 1710.

Figure 18:
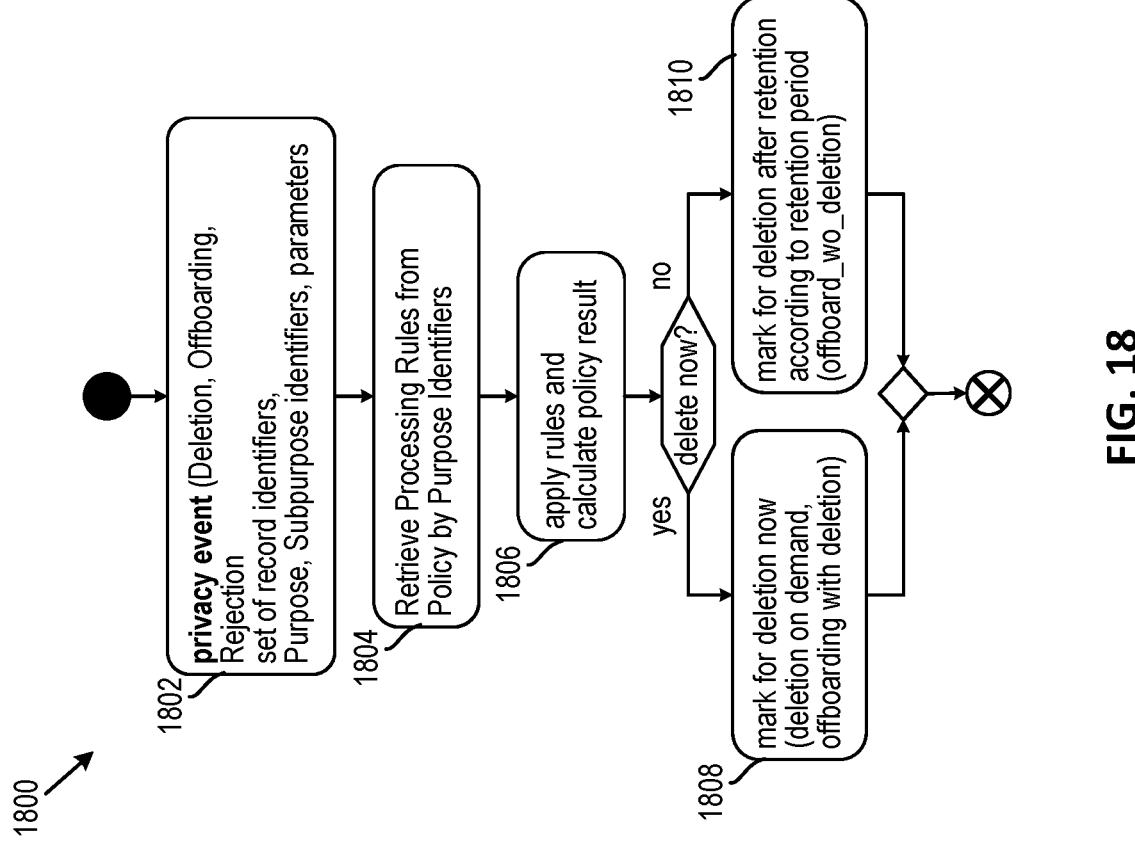
FIG. 18 depicts example privacy events processing based on a privacy deletion and retention policy, in accordance with various aspects of the present disclosure.

FIG. 18 depicts example privacy events processing (using a process 1800) based on a privacy deletion and retention policy, in accordance with various aspects of the present disclosure.

While Personal Data Record is in Operational State according to FIG. 15, several types of Privacy-related events may occur:

1.) On Demand Data Deletion—request to delete the personal data received from the data subject (e.g., user/person); 2.) Offboarding—the end of relationship with the data subject (person) resulting in the requirement to delete personal data, and 3.) Rejection—refusal by the entity to enter into the requested relationship with the data subject (e.g., account creation denied) after some preliminary process (evaluation or pre-onboarding, etc.). Each of those events results in the application of the processing rules retrieved from the Privacy Policy to obtain a data record disposition decision—if/when to delete or how long to retain the record Process 1800 may begin at action 1802, at which one of the privacy events (deletion, offboarding, rejection) may be specified. Various identifiers may be provided with the privacy event (e.g., a set of record identifiers, purpose data, subpurpose identifiers, relevant parameters, etc.).

Processing may continue at action 1804 at which processing rules may be retrieved for the policy using the purpose identifiers. At action 1806, the policy may be applied and the policy result may be determined. The policy may determine whether the data record including the personal data should be deleted. If the record should be deleted now due to the policy, the record may be marked for deletion at action 1808. Conversely, if the record should not be deleted now, the record may be marked for deletion after the retention period at action 1810.

Figure 19:
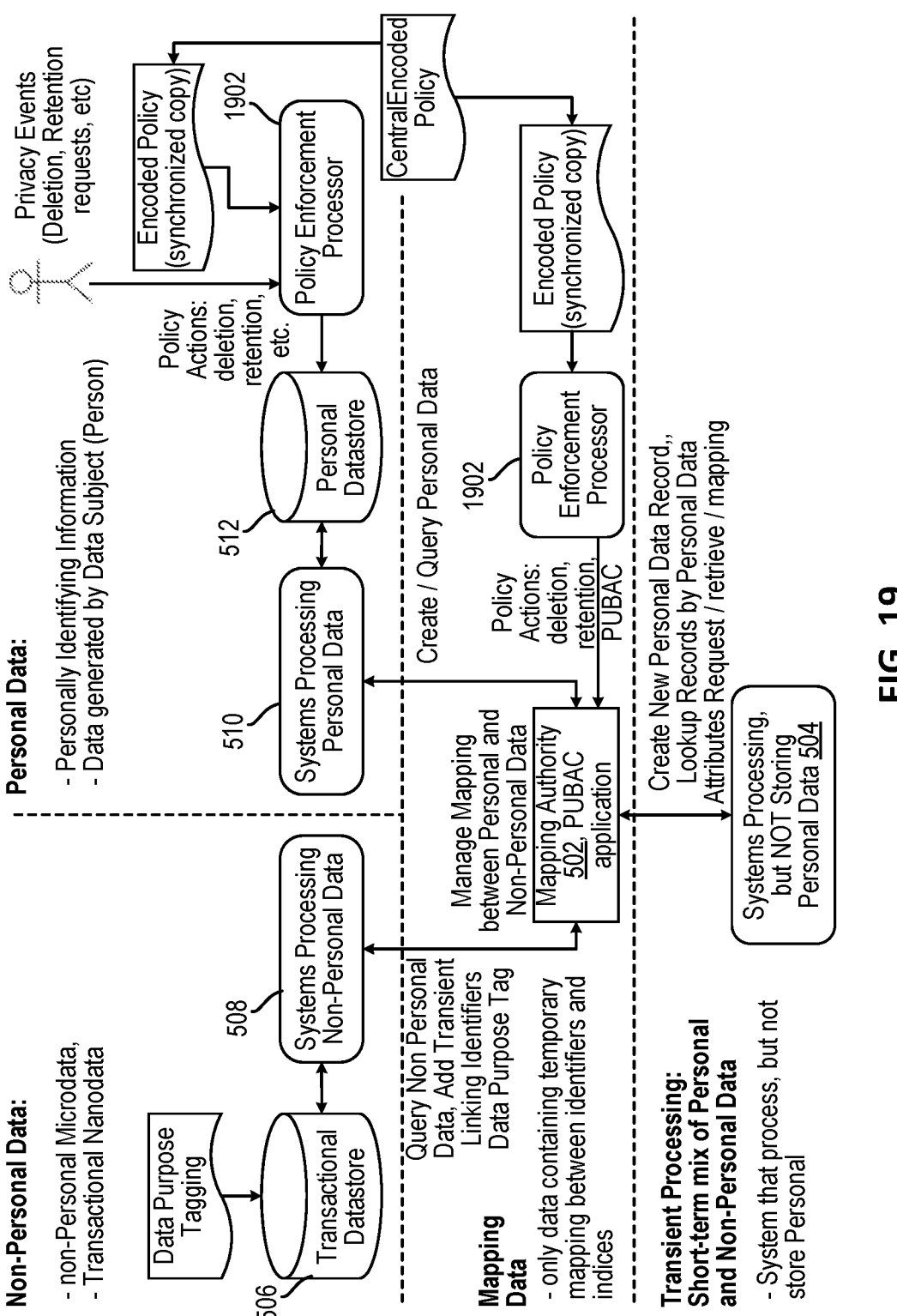
FIG. 19 depicts a centralized dynamic privacy preserving system for a distributed computing system, in accordance with various aspects of the present disclosure.

FIG. 19 depicts a centralized dynamic privacy preserving system (e.g., the system of FIG. 5) for a distributed computing system, in accordance with various aspects of the present disclosure. The Centrally Encoded Enterprise—(or entity division—) wide Privacy Policy is centrally maintained, and its copies get distributed (and synchronized) to both systems containing Personal Data, and Mapping Authority layer controlling mapping of transactional Non-Personal Data to Personal Data.

Privacy Events may then be processed by the policy enforcement processors 1902 that consider the purpose of the specific data, communicated by other systems in data access requests, and stored in data stores. Based on the policy, the privacy events get processed, and enforced according to the results of policy applications as previously described. Additionally, the mapping authority 502 processes the access control decisions for each query requesting a mapping to the personal data.

Figure 20:
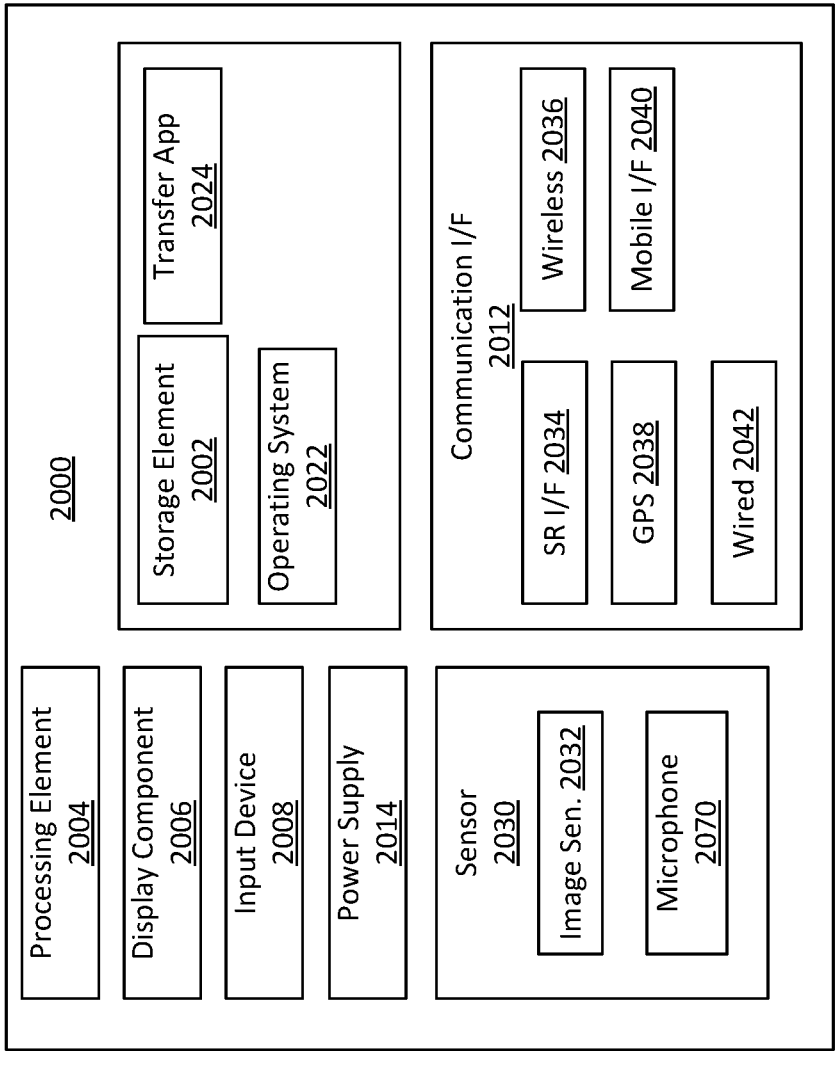
FIG. 20 is a block diagram showing an example architecture of a computing device that may be used in accordance with various embodiments described herein.

FIG. 20 is a block diagram showing an example architecture of a computing device that may be used in accordance with various embodiments described herein. It will be appreciated that not all devices will include all of the components of the architecture 2000 and some user devices may include additional components not shown in the architecture 2000. The architecture 2000 may include one or more processing elements 2004 for executing instructions and retrieving data stored in a storage element 2002. The processing element 2004 may comprise at least one processor. Any suitable processor or processors may be used. For example, the processing element 2004 may comprise one or more digital signal processors (DSPs). In some examples, the processing element 2004 may be effective to determine a wakeword and/or to stream audio data to a speech processing system. The storage element 2002 can include one or more different types of memory, data storage, or computer-readable storage media devoted to different purposes within the architecture 2000. For example, the storage element 2002 may comprise flash memory, random-access memory, disk-based storage, etc. Different portions of the storage element 2002, for example, may be used for program instructions for execution by the processing element 2004, storage of images or other digital works, and/or a removable storage for transferring data to other devices, etc. In various examples, the storage element 2002 may comprise instructions effective to program at least one processor to implement the dynamic privacy preserving data linkage in distributed computing systems and/or the mapping authority as described herein.

The storage element 2002 may also store software for execution by the processing element 2004. An operating system 2022 may provide the user with an interface for operating the computing device and may facilitate communications and commands between applications executing on the architecture 2000 and various hardware thereof. A transfer application 2024 may be configured to receive images, audio, and/or video from another device (e.g., a mobile device, image capture device, and/or display device) or from an image sensor 2032 and/or microphone 2070 included in the architecture 2000. In some examples, the transfer application 2024 may also be configured to send the received voice requests to one or more voice recognition servers.

When implemented in some user devices, the architecture 2000 may also comprise a display component 2006. The display component 2006 may comprise one or more light-emitting diodes (LEDs) or other suitable display lamps. Also, in some examples, the display component 2006 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 2006 may be effective to display content determined provided by a skill executed by the processing element 2004 and/or by another computing device.

The architecture 2000 may also include one or more input devices 2008 operable to receive inputs from a user. The input devices 2008 can include, for example, a push button, touch pad, touch screen, wheel, joystick, keyboard, mouse, trackball, keypad, light gun, game controller, or any other such device or element whereby a user can provide inputs to the architecture 2000. These input devices 2008 may be incorporated into the architecture 2000 or operably coupled to the architecture 2000 via wired or wireless interface. In some examples, architecture 2000 may include a microphone 2070 or an array of microphones for capturing sounds, such as voice requests.

When the display component 2006 includes a touch-sensitive display, the input devices 2008 can include a touch sensor that operates in conjunction with the display component 2006 to permit users to interact with the image displayed by the display component 2006 using touch inputs (e.g., with a finger or stylus). The architecture 2000 may also include a power supply 2014, such as a wired alternating current (AC) converter, a rechargeable battery operable to be recharged through conventional plug-in approaches, or through other approaches such as capacitive or inductive charging.

The communication interface 2012 may comprise one or more wired or wireless components operable to communicate with one or more other computing devices. For example, the communication interface 2012 may comprise a wireless communication module 2036 configured to communicate on a network, such as a computer communication network, according to any suitable wireless protocol, such as IEEE 802.11 or another suitable wireless local area network (WLAN) protocol. A short range interface 2034 may be configured to communicate using one or more short range wireless protocols such as, for example, near field communications (NFC), Bluetooth, Bluetooth LE, etc. A mobile interface 2040 may be configured to communicate utilizing a cellular or other mobile protocol. A Global Positioning System (GPS) interface 2038 may be in communication with one or more earth-orbiting satellites or other suitable position-determining systems to identify a position of the architecture 2000. A wired communication module 2042 may be configured to communicate according to the USB protocol or any other suitable protocol.

The architecture 2000 may also include one or more sensors 2030 such as, for example, one or more position sensors, image sensors, and/or motion sensors. An image sensor 2032 is shown in FIG. 20. An example of an image sensor 2032 may be a camera configured to capture color information, image geometry information, and/or ambient light information.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:

identifying a first data structure storing non-personal data;

identifying a second data structure storing personally identifiable information (PII), wherein the second data structure comprises first identifier data identifying first PII and second identifier data identifying second PII;

generating, by a mapping authority, first transient identifier data associated with a first time-to-live (TTL) value indicating an expiration of the first transient identifier data;

storing, by the mapping authority, the first transient identifier data and the first TTL value in a relational database in association with the first identifier data, wherein the first transient identifier data is transient as linking data with respect to the first identifier data; and sending, by the mapping authority, the first transient identifier data to a first computer processing system, wherein the first computer processing system is not privileged to directly access the second data structure.

2. The computer-implemented method of claim 1, further comprising:

receiving, by the mapping authority from the first computer processing system, a request for PII, the request comprising the first transient identifier data;

determining, by the mapping authority, that the request is received prior to expiration of the first TTL value;

determining, by the mapping authority based at least in part on the request being received prior to expiration of the first TTL value, the first identifier data;

sending, by the mapping authority to a second computing system that controls access to the second data structure, the first identifier data;

receiving, by the mapping authority from the second computing system, the first PII; and sending, by the mapping authority to the first computer processing system, the first PII.

3. The computer-implemented method of claim 1, further comprising:

receiving, by the mapping authority from the first computer processing system, a request for PII, the request comprising the first transient identifier data;

determining, by the mapping authority, that the request is received after expiration of the first TTL value; and sending, by the mapping authority, a response to the first computer processing system, wherein the response denies access to the PII.

4. The computer-implemented method of claim 1, further comprising:

receiving, by the mapping authority from a second computing system that controls access to the second data structure, a first deletion request, the first deletion request comprising the first identifier data and indicating that PII associated with the first identifier data has been deleted; and deleting, by the mapping authority in response to the first deletion request, an entry in the relational database that comprises the first transient identifier data, the first TTL value, and the first identifier data.

5. A method comprising:

identifying a first data structure storing non-personal data;

identifying a second data structure storing personally identifiable information (PII), wherein the second data structure comprises first identifier data identifying first PII and second identifier data identifying second PII;

generating, by a first computing service, first transient identifier data associated with a first time-to-live (TTL) value indicating an expiration of the first transient identifier data;

storing, by the first computing service, the first transient identifier data and the first TTL value in a third data structure in association with the first identifier data wherein the first transient identifier data is transient as linking data with respect to the first identifier data; and sending, by the first computing service, the first transient identifier data to a first computer processing system, wherein the first computer processing system is not privileged to directly access the second data structure.

6. The method of claim 5, further comprising:

receiving, by the first computing service from the first computer processing system, a request for PII, the request comprising the first transient identifier data;

determining that the request is received prior to expiration of the first TTL value;

determining, based at least in part on the request being received prior to expiration of the first TTL value, the first identifier data;

sending, by the first computing service to a second computing system that controls access to the second data structure, the first identifier data;

receiving, by the first computing service from the second computing system, the first PII; and sending, by the first computing service to the first computer processing system, the first PII.

7. The method of claim 5, further comprising:

receiving, by the first computing service from the first computer processing system, a request for PII, the request comprising the first transient identifier data;

determining, by the first computing service, that the request is received after expiration of the first TTL value; and sending, by the first computing service, a response to the first computer processing system, wherein the response denies access to the PII.

8. The method of claim 5, further comprising:

determining, by the first computing service, that the first TTL has expired; and deleting, by the first computing service, the first transient identifier data and the first identifier data from the third data structure.

9. The method of claim 5, further comprising:

receiving, by the first computing service from a second computing system that controls access to the second data structure, a first deletion request, the first deletion request comprising the first identifier data and indicating that PII associated with the first identifier data has been deleted from the second data structure; and deleting, by the first computing service in response to the first deletion request, the first transient identifier data and the first identifier data from the third data structure.

10. The method of claim 5, further comprising:

receiving, by the first computing service from a second computing system that controls access to the second data structure, first data comprising a first notification that third PII has been stored in the second data structure and third identifier data that identifies the third PII;

determining a retention policy associated with the third PII;

storing, by the first computing service, second transient identifier data in the third data structure in association with the third identifier data;

determining, by the first computing service, a second TTL value corresponding to the retention policy; and storing, by the first computing service, the second TTL value in the third data structure in association with the third identifier data and the second transient identifier data.

11. The method of claim 5, wherein the first computing service is effective to synchronize a data retention and deletion policy across a distributed computing architecture.

12. The method of claim 5, further comprising:

receiving, by the first computing service from the first computer processing system, a request for PII, the request comprising the first transient identifier data and first policy tag data;

determining that the request is received prior to expiration of the first TTL value;

determining a first computer-implemented policy corresponding to the first policy tag data;

determining that the request complies with the first computer-implemented policy;

determining, based at least in part on the request complying with the first computer-implemented policy, the first identifier data;

sending, by the first computing service to a second computing system that controls access to the second data structure, the first identifier data;

receiving, by the first computing service from the second computing system, the first PII; and sending, by the first computing service to the first computer processing system, the first PII.

13. A system comprising:

at least one processor; and non-transitory computer-readable memory storing instructions that, when executed by the at least one processor, are effective to cause the at least one processor to:

identify a first data structure storing non-personal data;

identify a second data structure storing personally identifiable information (PII), wherein the second data structure comprises first identifier data identifying first PII and second identifier data identifying second PII;

generate first transient identifier data associated with a first time-to-live (TTL) value indicating an expiration of the first transient identifier data;

store the first transient identifier data and the first TTL value in a third data structure in association with the first identifier data, wherein the first transient identifier data is transient as linking data with respect to the first identifier data; and send the first transient identifier data to a first computer processing system, wherein the first computer processing system is not privileged to directly access the second data structure.

14. The system of claim 13, the non-transitory computer-readable memory storing further instructions that, when executed by the at least one processor, are further effective to cause the at least one processor to:

receive, from the first computer processing system, a request for PII, the request comprising the first transient identifier data;

determine that the request is received prior to expiration of the first TTL value;

determine, based at least in part on the request being received prior to expiration of the first TTL value, the first identifier data;

send, to a second computing system that controls access to the second data structure, the first identifier data;

receive, from the second computing system, the first PII; and send, to the first computer processing system, the first PII.

15. The system of claim 13, the non-transitory computer-readable memory storing further instructions that, when executed by the at least one processor, are further effective to cause the at least one processor to:

receive, from the first computer processing system, a request for PII, the request comprising the first transient identifier data;

determine that the request is received after expiration of the first TTL value; and send a response to the first computer processing system, wherein the response denies access to the PII.

16. The system of claim 13, the non-transitory computer-readable memory storing further instructions that, when executed by the at least one processor, are further effective to cause the at least one processor to:

determine that the first TTL has expired; and delete the first transient identifier data and the first identifier data from the third data structure.

17. The system of claim 13, the non-transitory computer-readable memory storing further instructions that, when executed by the at least one processor, are further effective to cause the at least one processor to:

receive, from a second computing system that controls access to the second data structure, a first deletion request, the first deletion request comprising the first identifier data and indicating that PII associated with the first identifier data has been deleted from the second data structure; and delete, in response to the first deletion request, the first transient identifier data and the first identifier data from the third data structure.

18. The system of claim 13, the non-transitory computer-readable memory storing further instructions that, when executed by the at least one processor, are further effective to cause the at least one processor to:

receive, from a second computing system that controls access to the second data structure, first data comprising a first notification that third PII has been stored in the second data structure and third identifier data that identifies the third PII;

determine a retention policy associated with the third PII;

store second transient identifier data in the third data structure in association with the third identifier data;

determine a second TTL value corresponding to the retention policy; and store the second TTL value in the third data structure in association with the third identifier data and the second transient identifier data.

19. The system of claim 18, the non-transitory computer-readable memory storing further instructions that, when executed by the at least one processor, are further effective to synchronize a data retention and deletion policy across a distributed computing architecture.

20. The system of claim 13, the non-transitory computer-readable memory storing further instructions that, when executed by the at least one processor, are further effective to cause the at least one processor to:

receive, from the first computer processing system, a request for PII, the request comprising the first transient identifier data and first policy tag data;

determine that the request is received prior to expiration of the first TTL value;

determine a first computer-implemented policy corresponding to the first policy tag data;

determine that the request complies with the first computer-implemented policy;

determine, based at least in part on the request complying with the first computer-implemented policy, the first identifier data;

send, to a second computing system that controls access to the second data structure, the first identifier data;

receive, from the second computing system, the first PII; and send, to the first computer processing system, the first PII.

* * * * *